(12) United States Patent
Lienhard et al.

(10) Patent No.: US 9,956,528 B2
(45) Date of Patent: May 1, 2018

(54) ENERGY-EFFICIENT CONDUCTIVE-GAP MEMBRANE DISTILLATION

(71) Applicant: Massachusetts Institute of Technology, Cambridge, MA (US)

(72) Inventors: John H. Lienhard, Lexington, MA (US); Jaichander Swaminathan, Cambridge, MA (US); David Elan Martin, Potomac, MD (US); Hyung Won Chung, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 123 days.

(21) Appl. No.: 14/854,946

(22) Filed: Sep. 15, 2015

(65) Prior Publication Data

US 2016/0074812 A1    Mar. 17, 2016

Related U.S. Application Data

(60) Provisional application No. 62/050,334, filed on Sep. 15, 2014.

(51) Int. Cl.
*C02F 1/04* (2006.01)
*B01D 61/36* (2006.01)
(Continued)

(52) U.S. Cl.
CPC ......... *B01D 61/364* (2013.01); *B01D 61/366* (2013.01); *B01D 63/082* (2013.01);
(Continued)

(58) Field of Classification Search
None
See application file for complete search history.

(56) References Cited

U.S. PATENT DOCUMENTS

| 4,545,862 A | 10/1985 | Gore et al. |
| 4,620,900 A * | 11/1986 | Kimura ............... B01D 61/364 |
| | | 159/DIG. 27 |

(Continued)

OTHER PUBLICATIONS

Material Gap Membrane Distillation.pdf—Aug. 20, 2013—Francis et al.*

(Continued)

*Primary Examiner* — Krishnan S Menon
*Assistant Examiner* — Bradley R Spies
(74) *Attorney, Agent, or Firm* — Modern Times Legal; Robert J. Sayre

(57) ABSTRACT

Apparatus for energy-efficient conductive-gap membrane distillation includes a feed-liquid source and a distillation module. The distillation module includes a feed-liquid chamber in fluid communication with the feed-liquid source. The feed-liquid chamber includes a selectively porous material that allows a component of the feed liquid to pass through the selectively porous material and exit the feed-liquid chamber in vapor form but not in liquid form. The distillation module also includes a conductive-gap chamber adjacent to the selectively porous material on an opposite side of the selectively porous material from the feed-liquid chamber; a heat-transfer surface maintained at a lower temperature than the feed liquid in the feed-liquid chamber, wherein the heat-transfer surface is in thermal contact with the conductive-gap chamber; and a thermally conductive material extending across the conductive-gap chamber.

28 Claims, 16 Drawing Sheets

(51) Int. Cl.
*B01D 63/10* (2006.01)
*B01D 71/34* (2006.01)
*B01D 71/36* (2006.01)
*C02F 1/44* (2006.01)
*B01D 63/08* (2006.01)
*B01D 71/26* (2006.01)

(52) U.S. Cl.
CPC .............. *C02F 1/447* (2013.01); *B01D 71/26* (2013.01); *B01D 71/34* (2013.01); *B01D 71/36* (2013.01); *B01D 2313/38* (2013.01)

(56) References Cited

U.S. PATENT DOCUMENTS

| | | | | |
|---|---|---|---|---|
| 4,818,345 | A | * | 4/1989 | Jonsson ............... B01D 61/364 159/DIG. 27 |
| 5,419,136 | A | | 5/1995 | McKeigue |
| 7,111,673 | B2 | | 9/2006 | Hugill |
| 2011/0180383 | A1 | | 7/2011 | Ma et al. |
| 2012/0111551 | A1 | * | 5/2012 | Cao ........................... F28F 1/36 165/181 |

OTHER PUBLICATIONS

R. Tian, et al., "A new enhancement technique on air gap membrane distillation," 332 Distillation 52-59 (2014).

US Patent and Trademark Office, International Search Report and Written Opinion for PCT/US2015/050233 (corresponding PCT application) (dated Dec. 8, 2015).

* cited by examiner

ENERGY-EFFICIENT CONDUCTIVE-GAP MEMBRANE DISTILLATION

RELATED APPLICATION

This application claims the benefit of U.S. Provisional Application No. 62/050,334, filed 15 Sep. 2014, the entire content of which is incorporated herein by reference.

BACKGROUND

Membrane distillation for desalination involves the passage of hot salt water (as a feed liquid) over a microporous hydrophobic membrane that allows pure water vapor through while retaining the dissolved salts in solution by establishing a temperature-driven vapor pressure difference between the feed and permeate sides of the module. The hydrophobicity of the membrane ensures that liquid water does not pass through the membrane and thereby ensures nearly complete elimination of non-volatile impurities.

Depending on the design of the condensing/permeate system on the other side of the membrane, membrane distillation is categorized into various types, as described below.

In direct contact membrane distillation (DCMD), a cold pure water stream flows on the other side (i.e., the permeate/condensate side) of the membrane from and counter-current to the feed; and the water vapor condenses into the cold pure water stream, transferring heat into the cold pure water stream, when the water vapor leaves the membrane. Because the hot and cold streams are separated only by a thin membrane, there is significant sensible heat transfer. This heat transfer, in addition to being a loss, also adds to temperature polarization in the streams. The heated pure water stream then goes through a heat exchanger where energy is transferred into the incoming feed to preheat it, thereby recovering part of the condensation energy.

In the case of air gap membrane distillation (AGMD), there is an air gap across which the vapor diffuses before condensing on a heat-transfer plate maintained at a low temperature by a coolant stream. Consequently, sensible heat loss from the feed is reduced since air has a lower thermal conductivity. The evaporated water has to diffuse through the air gap and reach the film of condensate on the cold plate, which becomes one of the rate limiting steps.

In liquid gap or permeate gap membrane distillation (LGMD or PGM), shown in FIG. 1, the air gap of AGMD is replaced by a pure water column 16, which can be relatively stagnant and which fills the entire region between the membrane 14 and the heat-transfer plate 12. Vapor passing through the membrane 14 can condense immediately into water column 16 upon leaving the membrane 14. Feed liquid 18 is circulated via a pump 24 and flows through chambers 30 and 32 on opposite sides of the membrane 14 and heat-transfer plate 12 and is heated by a heater 28 when passing from the first chamber 30 (where the feed liquid serves as a coolant via heat transfer through the heat-transfer plate 12) to the second chamber 32, from which the pure water is removed from the heated feed water through the membrane 14. Pure water product 20 is extracted from the bottom of the liquid gap, while the brine 22 remaining from the feed liquid 18 is extracted from the bottom of the second chamber 32. In other embodiments, the pure water product 18 is extracted from the top of the liquid gap. The gaps in AGMD and LGMD systems have also used a spacer material, typically made of non-conductive plastic to hold the membrane 14 in place.

Sweeping gas membrane distillation (SGMD) utilizes an air stream that flows on the permeate side picking up the incoming vapor and becoming humidified as the stream moves along the module. Generally, the temperature of air also increases along the module. The hot humid air is then cooled in a condenser where produced pure water is recovered.

Material gap membrane distillation (MGMD) is a recent configuration where sand, which has a low thermal conductivity (i.e., acts as a thermal insulator), is used to fill the gap [see L. Francis, et al., "Material gap membrane distillation: A new design for water vapor flux enhancement," 448 Journal of Membrane Science 240-247 (2013)].

Other configurations include the vacuum membrane distillation (VMD) system, which has been adapted into a multi-stage configuration and is being marketed commercially by Memsys of Singapore and Germany [see Zhao, K., et al. "Experimental study of the memsys vacuum-multi-effect-membrane-distillation (V-MEMD) module." *Desalination* 323 (201.3): 150-160].

The difference in performance between these systems is a consequence of different transport resistances on the condensing side.

SUMMARY

A conductive-gap distillation apparatus and methods for distillation using a thermally conductive material are described herein, where various embodiments of the apparatus and methods may include some or all of the elements, features and steps described below.

An apparatus for energy-efficient conductive-gap distillation includes a feed-liquid source (that supplies a feed liquid) and a distillation module. The distillation module includes a feed-liquid chamber containing feed liquid in fluid communication with the feed-liquid source to establish a flow of the feed liquid through the feed-liquid chamber. The feed-liquid chamber includes a selectively porous material that allows a component of the feed liquid to pass through the selectively porous material and exit the feed-liquid chamber in vapor form but not in liquid form. The distillation module also includes a conductive-gap chamber adjacent to the selectively porous material on an opposite side of the selectively porous material from the feed-liquid chamber; a heat-transfer surface maintained at a lower temperature than the feed liquid in the feed-liquid chamber, wherein the heat-transfer surface is in thermal contact with the conductive-gap chamber; and a thermally conductive material extending across the conductive-gap chamber.

In a method for energy-efficient liquid gap distillation, a feed liquid flows through a first feed-liquid chamber of a distillation module and is heated. The heated feed liquid then flows through a second feed-liquid chamber of the distillation module, wherein the second feed-liquid chamber includes a selectively porous material that includes an outer surface in fluid communication with a gap between the selectively porous material and the first feed-liquid chamber. Heat, from the feed liquid in the second feed-liquid chamber, is transferred through a thermally conductive material extending across the conductive-gap chamber, and a vapor component from the feed liquid in the second feed-liquid chamber permeates through the selectively porous material into the conductive-gap chamber. The vapor component of the feed liquid is condensed to form a liquid condensate in the conductive-gap chamber, and a brine remaining from the feed liquid after the vapor component permeates through the selectively porous material is removed from the second feed-liquid chamber.

In the enhanced LGMD system, the transport resistance in the gap is greatly reduced. Conventionally, low conductivity spacer materials made of polypropylene are usually used because reducing the gap resistance while increasing flux would also lead to detrimental effects, such as higher sensible heat loss and higher temperature polarization in the hot fluid side. Detailed modeling of the heat and mass transfer processes showed that the effect of the high-conductivity material would be positive.

The apparatus and methods of this disclosure utilize a high-conductivity material on the condensate/permeate side of a liquid gap distillation system to increase the effective thermal conductivity across the conductive-gap chamber (i.e., promoting heat transfer across the conductive-gap chamber) and to improve flux and energy efficiency. This system is hereafter referred to as a conductive gap distillation (CGMD) apparatus. In particular, embodiments of the CGMD apparatus described herein can more efficiently utilize more heat for mass transfer, while less energy is unused and discarded in the discharged brine stream. Moreover, use of the thermally conductive material may reduce the amount of heat that is added in the conduit between the feed-liquid chambers. The innovation has been thoroughly modeled numerically and verified experimentally on a lab scale, as reported, infra, showing significant improvements with initial results that support the technology's competitive advantage in condensate flux and efficiency.

Conventional wisdom in membrane distillation suggests that the extent of heat transfer from the second feed-liquid chamber directly into the first feed-liquid chamber needs to be reduced, and this is probably why the configuration described herein has not been explored. Numerical modeling of CGMD shows that not only is flux higher but energy efficiency is also higher compared to the conventional technologies, such as AGMD and DCMD. While LGMD also outperforms the other conventional technologies, the improvement with well-designed CGMD is pronounced.

The apparatus and methods can be advantageous compared to large-scale multi-stage flash distillation (MSF) and multiple-effect distillation (MED) plants since the amount of metal required in its construction can be smaller. The large systems also have several additional components to create and maintain low pressures, whereas no vacuum is needed in this system. The construction cost in a single-stage CGMD configuration can also be much less than, e.g., Memsys' multi-stage vacuum membrane distillation systems since no vacuum pumps or pressure chambers are required in the CGMD system.

BRIEF DESCRIPTION OF THE DRAWINGS

FIG. 39 includes a hydrophobic support layer 78 that excludes the pure liquid water 16, while FIG. 39 includes a hydrophilic support layer 78 permeated with the pure liquid water 16.

Figure 1:
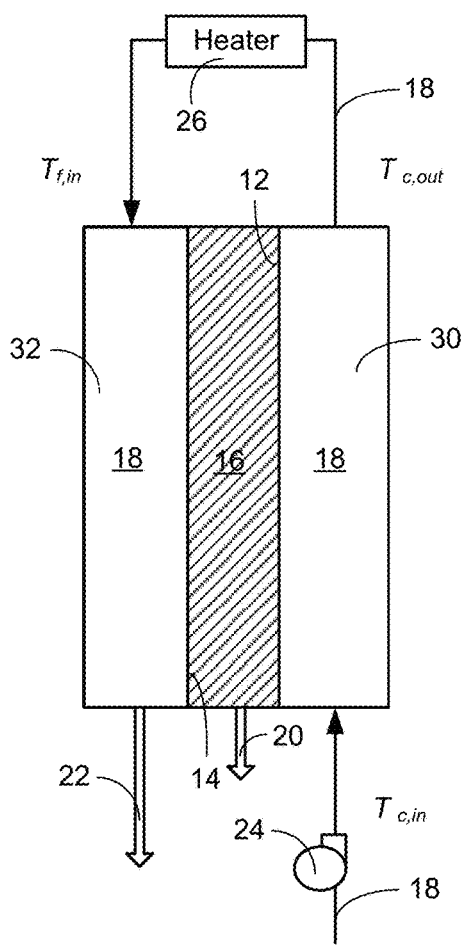
FIG. 1 is an illustration of an apparatus for liquid/permeate gap membrane distillation (LGMD), where a plastic mesh spacer in the gap is not shown.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2%) can be understood as being within the scope of the description; likewise, if a particular shape is referenced, the shape is intended to include imperfect variations from ideal shapes, e.g., due to manufacturing tolerances. Percentages or concentrations expressed herein can be in terms of weight or volume. Processes, procedures and phenomena described below can occur at or around ambient pressure (e.g., about 50-120 kPa—for example, about 90-110 kPa) and temperature (e.g., −20 to 50° C.—for example, about 10-35° C.) unless otherwise specified.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Additionally, the various components identified herein can be provided in an assembled and finished form; or some or all of the components can be packaged together and marketed as a kit with instructions (e.g., in written, video or audio form) for assembly and/or modification by a customer to produce a finished product.

Distillation using a membrane or another type of selectively porous material (which may, for convenience, collectively be referred to as "membranes" herein) is used to separate the more volatile component of a mixture through phase change. The main areas of application include desalination, food processing, waste treatment, and high purity water production for industrial applications. Due to its ability to use low feed-liquid temperatures, membrane distillation is well suited for harnessing solar and geothermal energy sources and has seen much growth in off-grid remote desalination applications. The overall market, on the other hand, is dominated by other large scale multi-stage flash (MSF) or multi-effect distillation (MED) systems that produce millions of gallons of water per day and consume lesser energy per unit of desalinated water produced [characterized by a gained output ratio (GOR) in excess of ~8]. The invention shows promise for similar efficiencies with lower capital investments.

While LGMD without the high-conductivity material described herein has been suggested as a superior alternative to both air gap (AGMD) and direct contact (DCMD) configurations [see L. Francis, et al., "Material gap membrane distillation: A new design for water vapor flux enhancement," 448 J. of Membrane Science, 240-47 (2013) and R. G. Raluy, "Operational experience of a solar membrane distillation demonstration plant in Pozo Izquierdo-Gran Canaria Island (Spain)," 290 Desalination 1-13 (2012)], the relative advantage in terms of energy efficiency improvements has not been quantified. Numerical modeling shows that the proposed novel system achieves energy efficiency that is twice as high as other membrane distillation configurations.

Figure 2:
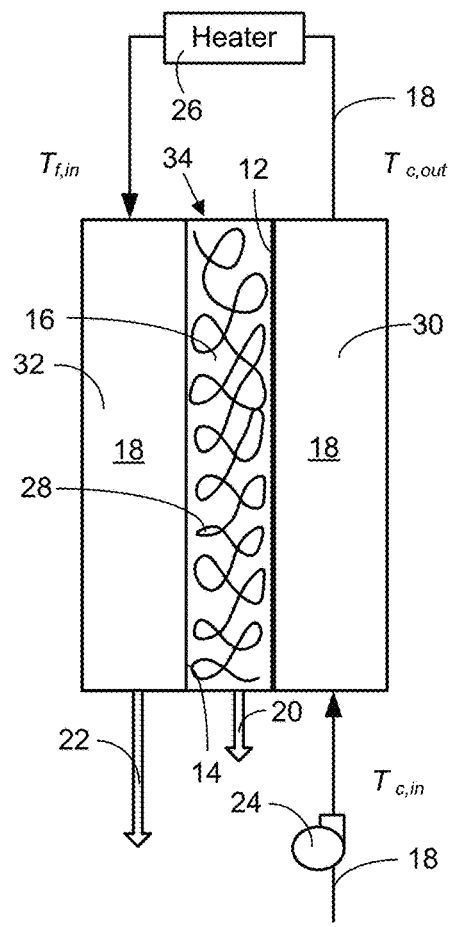
FIG. 2 is an illustration of an embodiment of a high-conductivity gap membrane distillation (CGMD) apparatus using an aluminum spacer material in the gap.

A method of increasing the gap conductivity using a thermally conductive material 28 in the conductive-gap chamber 34 between the heat-transfer plate 12 and the selectively porous material 14 (e.g., a flat membrane) is shown in FIG. 2. A feed liquid 18 [e.g., salt water (with salt content of, e.g., 0.5 to 40% by weight), water with suspended solute(s) or oil(s), an alcohol-water mixture, fruit juice(s)] is circulated via a pump 24 through a first feed-liquid chamber 30 bounded by a heat-transfer plate 12. The feed liquid 18 then passes through a heater 26 that raises its temperature, e.g., to 40-100° C. This degree of heating can be provided by a heater 26 in the form of a solar collector. Alternatively, the feed liquid can be pressurized and its temperature can be raised to 100-140° C. by the heater before entering the second feed-liquid chamber 32. The heated feed liquid 18 then flows through the second feed-liquid chamber 32, where a vapor phase (i.e., a component of the feed liquid with higher volatility than other components in the feed liquid) passes from the second chamber 32 through micropores (e.g., pores with diameters of 0.1 to 0.6 µm) in the selectively porous material 14 into the conductive-gap chamber 34 where the vapor recondenses (e.g., as pure water) as it cools. Cooling is provided by heat transfer across the thermally conductive material 28 and through the heat-transfer plate 12 to the cooler liquid in the first feed-liquid chamber 30. At the bottom of the second feed-liquid chamber 32, a concentrated brine 22 is removed, while the extracted fluid 20 (in liquid form) is removed from the top or bottom of the conductive-gap chamber 34.

In other embodiments, a separate coolant fluid can pass through the first feed-liquid chamber 30 instead of the unheated feed liquid 18 to provide cooling.

Figure 3:
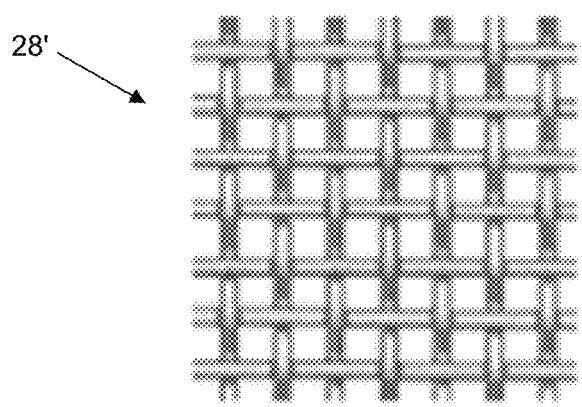
FIG. 3 is an illustration of a metal mesh material for use in a high-conductivity CGMD apparatus.
Figure 4:
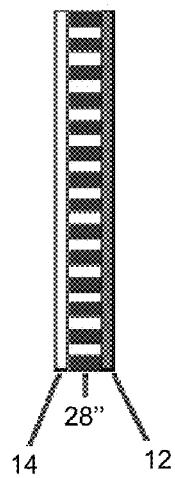
FIGS. 4-7 show sections of CGMD configurations with conductive material in the conductive-gap chamber in the form of a fin sheet (FIG. 4), a metal mesh (FIG. 5), a domed fin sheet (FIG. 6), and sheet wool (FIG. 7).
Figure 5:
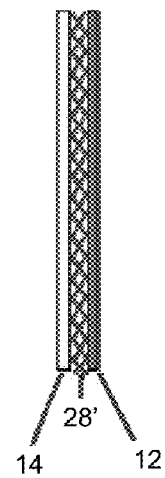
Figure 6:
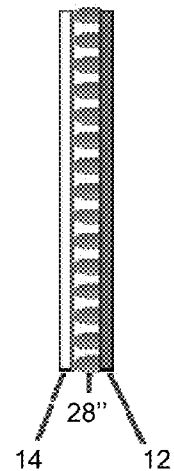
Figure 7:
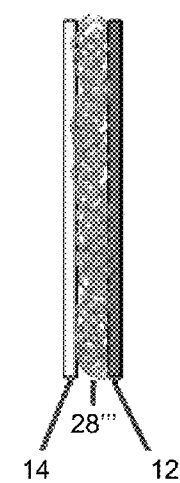

The thermally conductive material 28 can be in the form of, e.g., (a) a mesh 28', as shown in FIGS. 3 and 5; (b) several fins 28" on (e.g., an integral component of) the heat-transfer plate 12, as shown in FIGS. 4 and 6; (c) using thermally conductive (e.g., steel) wool 28''', as shown in FIG. 7; or (d) any other porous thermally conductive medium 28 extending across the conductive-gap chamber 34. The thermally conductive material 28 has a high thermal conductivity [e.g., greater than 5 W/(m·K) or, in particular embodiments, greater than 100 W/(m·K)]. The thermally conductive material 28 can be, e.g., a metal or other thermally conductive material, such as sapphire or carbon nanotubes.

Embodiments of the thermally conductive material 28 are advantageously corrosion resistant because it may continuously contact liquid pure water. Additionally, embodiments of the thermally conductive material 28 are structurally robust yet non-damaging to the membrane 14, where a membrane 14 is used, as the thermally conductive material 28 may be in direct contact with the selectively porous material 14 and with the heat-transfer plate 12. Further still, embodiments of the thermally conductive material 28 are structured (e.g., with grooves) so that the thermally conductive material 28 does not overly restrict the flow of permeate liquid through the conductive-gap chamber 34. To provide heat transfer enhancement across the vertical length of the apparatus, the thermally conductive material 28 can extend from top to bottom of the conductive-gap chamber 34 (e.g., across top, middle, and bottom thirds of the gap). Other relevant changes to the design include intermittently breaking the metal contact along the length of the module to reduce axial conduction effects. Similarly, water can be collected from the sides of the apparatus rather than from the bottom, and the condensate can flow across the width of the module rather than the entire length.

In some embodiments, the thermally conductive material 28 is an anisotropic material, wherein the high thermal conductivity [e.g., greater than 5 W/(m·K)] is unidirectional. Examples of compositions that can serve as the thermally conductive material 28 can include metals, sapphire, composites, conductive plastics, carbon nanotubes, or carbon fiber. In various embodiments, the thermally conductive material 28 is also configured to physically support the selectively porous material 14 (e.g., in the form of a membrane) from collapsing onto the heat-transfer plate 12.

In additional embodiments, the thermally conductive material 28 is also positioned in and extends across the first and/or second feed-liquid chambers 30 and 32 to improve heat transfer in either or both of the chambers 30 and 32.

The selectively porous material 14 through which the vapor passes is hydrophobic (i.e., has a contact angle of greater than 90° with the feed liquid 18); Accordingly, the selectively porous material 14 allows vapors to pass through but not water or other liquid-phase components. In particular embodiments, the selectively porous material 14 is a polymer membrane formed, e.g., of polyvinylidene difluoride (PVDF), polytetrafluoroethylene (PTFE), or polypropylene (PP). In other embodiments, the selectively porous material 14 is formed of a porous ceramic material or of porous graphene.

The enhanced conductivity methods, described above, can be implemented in direct contact membrane distillation (DCMD) on the permeate side. This configuration resembles stagnant liquid gap membrane distillation, but uses flow recirculation instead of stagnant collection on the condensate side, which also requires heat recovery. The enhancement will not be as significant as the flux enhancement in stagnant liquid gap as DCMD is relatively well mixed, but the enhancement will still provide condensate flux and efficiency improvement for the same reasons. The enhancement may be especially useful in low flow speed (laminar) DCMD systems. Additionally, the enhanced conductivity of flow can be applied to the feed channel, which makes it applicable to all forms of membrane distillation.

Efficiency Parameter Optimization for Membrane Distillation

The existing MD efficiency parameter, $\eta$, indicates a fraction of how much of the heat is used for evaporation desalination compared to the total heat transfer, which also includes conduction losses. Here, we also utilize the parameter of effectiveness, $\varepsilon$, which is a fractional heat transfer rate compared to zero heat transfer resistance, related to NTU. Essentially, CGMD exhibits some losses in increased conduction due to lower $\eta$, but the corresponding increase in $\varepsilon$ can more than compensate for the loss in $\eta$. To maximize $\eta$, however, the membrane provides some thermal resistance (e.g., via increased thickness and by being hydrophobic on both of its surfaces to avoid condensation inside the membrane). Preventing condensation inside the membrane reduces heat transfer through the membrane, as water conducts heat better than vapor does.

While the literature has focuses on the importance of reducing conduction losses through the membrane (or increasing thermal efficiency, $\eta$), the relatively higher importance of achieving better heat recovery within the module (or higher effectiveness, $\varepsilon$) is shown. This theory is used to explain the increasing trend of GOR observed in AGMD, PGMD and CGMD with improving gap conductance.

The conventional wisdom around the design of MD systems has been focused on improving flux through the design of more permeable membranes and on reducing the extent of sensible heat loss through the membrane. To achieve these objectives, implemented MD system designs proceeded from DCMD to AGMD where the air gap was preferred due to its low thermal conductivity thus ensuring low heat loss from the hot side.

MD thermal efficiency, $\eta$, is defined in Eq. 1 to quantify the extent of heat loss due to conduction through the membrane]. A value of $\eta=1$ would correspond to an ideal system where all the energy transfer is through vapor transfer and pure water production rather than heat conduction. $\eta$ may not be 1 even with a membrane that is perfectly insulating due heat conduction happening across the vapor, but it is a useful upper limit to consider.

$$\eta = \frac{\dot{Q}_{mass}}{\dot{Q}_{total}} = \frac{\dot{Q}_{mass}}{\dot{Q}_{mass} + \dot{Q}_{cond}}, \quad (1)$$

where $\dot{Q}_{mass}$ is the heat transfer associated with vapor transport through the membrane, where $\dot{Q}_{cond}$ refers to the conduction heat transfer across the membrane, and where $\dot{Q}_{total}$ is the total heat transferred from the hot stream to the cold stream.

Adapted from two-stream heat exchange theory, the MD system effectiveness, $\varepsilon$, compares the actual change in enthalpy of the cold stream to the maximum possible change in enthalpy of the cold stream. The specific heat capacity is relatively constant over the range of temperatures considered, so the equation may be reduced to a ratio of temperature differences. The cold stream is an ideal choice for defining $\varepsilon$ since the mass flow rate and salinity of the cold stream are constant along the length of the module.

$$\varepsilon = \frac{h_{c,out} - h_{c,in}}{h_{f,in} - h_{c,in}} = \frac{T_{c,out} - T_{c,in}}{T_{f,in} - T_{c,in}}, \quad (2)$$

where h is the specific enthalpy and T is temperature; and where subscript c represents the cold stream, subscript f represents the feed (hot) stream, and in and out represent inlet and outlet, respectively. $\varepsilon$ is, therefore, a measure of energy transfer between the hot and cold streams scaled by the total possible energy transfer and a value of $\varepsilon=1$ corresponds to an infinite area MD heat exchanger where the cold stream leaves at the hot inlet temperature and vise versa.

Using $\eta$ and $\varepsilon$, an expression can be derived for GOR as follows:

$$GOR = \frac{\dot{m}_p h_{fg}}{\dot{Q}_{heater}} \quad (3)$$

$$\approx \frac{\dot{Q}_{mass}}{\dot{Q}_{heater}}$$

$$= \eta \times \frac{\dot{Q}_{total}}{\dot{Q}_{heater}}$$

$$= \eta \times \frac{T_{c,out} - T_{c,in}}{T_{f,in} - T_{c,out}}$$

$$= \eta \times \frac{\varepsilon}{1-\varepsilon}.$$

According to Eq. 3, GOR increases non-linearly with an increase in $\varepsilon$, whereas the dependence on $\eta$ is linear.

At any local position, the resistance across the membrane can be expressed as two resistors in parallel, one corresponding to conduction through the membrane and the other corresponding to heat transfer through the vapor passage.

Figure 35:
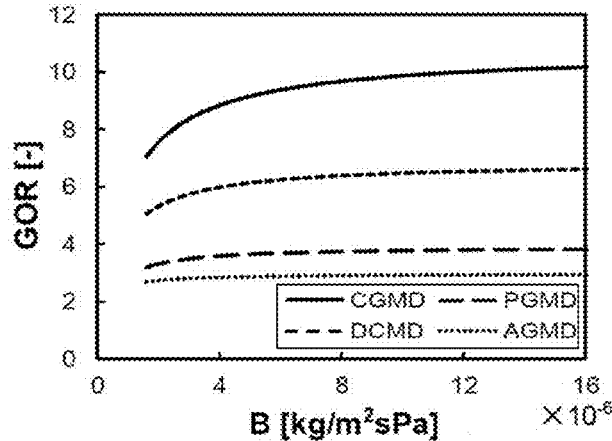
FIG. 35 plots the effect of membrane permeability (B) on GOR for CGMD, PGMD, DCMD, and AGMD.
Figure 36:
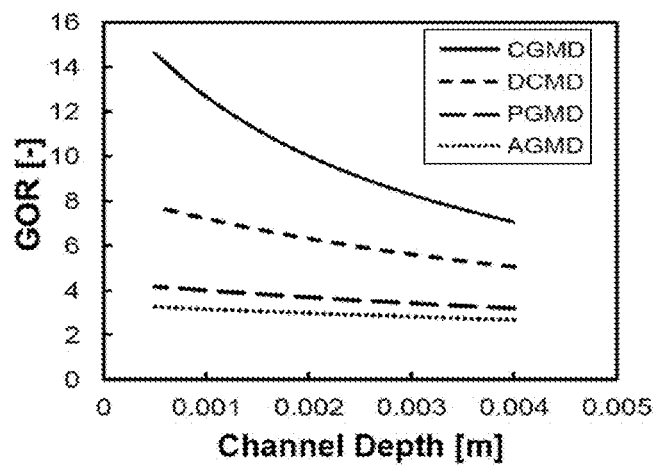
FIG. 36 plots the effect of channel depth on GOR for CGMD, PGMD, DCMD, and AGMD.

Any improvements in the membrane permeability or in the heat transfer coefficients within the feed and cold stream channels results in significant GOR improvements through increase in $\varepsilon$. FIGS. 35 and 36 show that with an increase in B, the GOR of CGMD increases by about 50%; and with an in increase in $h_f'=h_c'$, GOR increases by about 100%, whereas the increase in GOR for AGMD is minimal.

Figure 37:
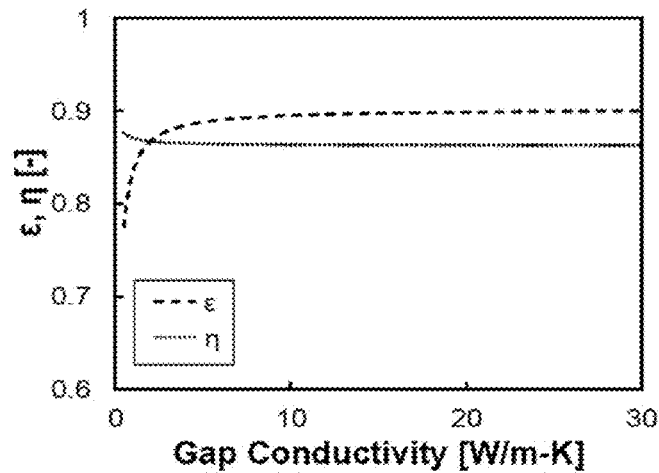
FIG. 37 plots the effect of gap conductivity on MD system effectiveness, $\varepsilon$, and MD thermal efficiency, $\eta$.
Figure 38:
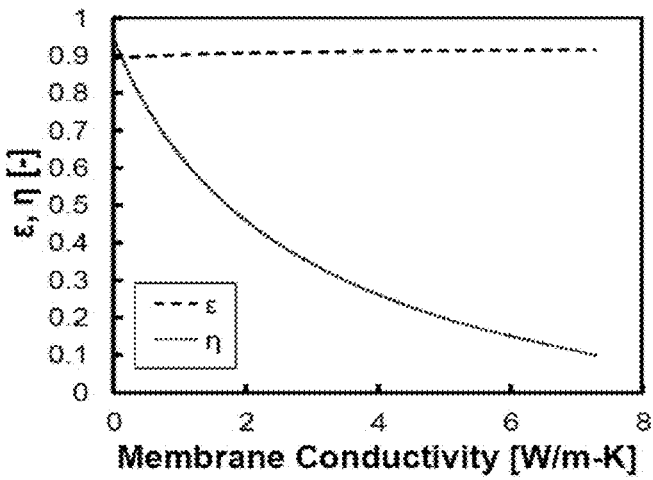
FIG. 38 plots the effect of membrane conductivity on MD system effectiveness, $\varepsilon$, and MD thermal efficiency, $\eta$.

The effect of $\eta$ and $\varepsilon$ on system performance are shown in FIGS. 37 and 38. While increasing $k_{gap}$ leads to a small decrease in $\eta$, the increase in $\varepsilon$ dominates, leading to 100% increase in GOR when going from $k_{gap}=0.6 \to 10$ W/m·K. On the other hand, when $k_m$ increases, $\varepsilon$ increases slightly, but $\eta$ decreases dramatically, leading to diminishing GOR. As a result, membrane design is focused on increasing $\eta$ by reducing $k_m$, whereas module design targets an increase in $\varepsilon$.

The thickness of the porous material (e.g, membrane) effects both the thermal conductance across the porous material as well as the permeability. In particular embodiments, the porous material is thick enough such that the overall conductance across the porous material is less than 2,500 W/m²-K; and in more-particular embodiments, the porous material has an overall thermal conductance of less than 500 W/m²-K.

Figure 39:
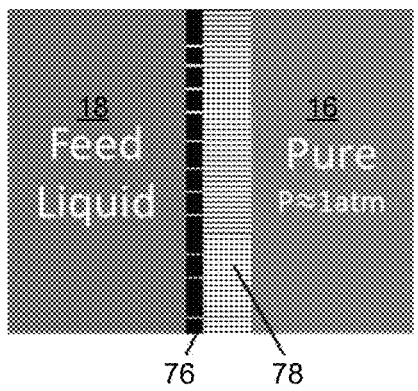
FIGS. 39 and 40 are schematic illustrations showing the membrane and the active layer across which liquid is prevented from flowing.
Figure 40:
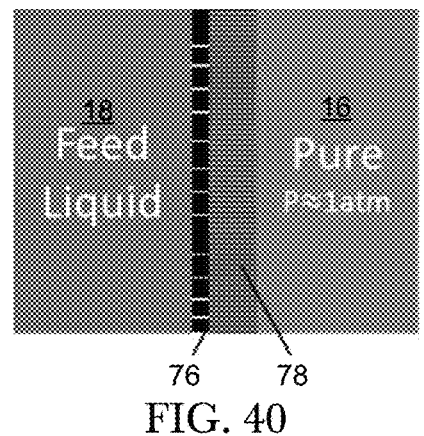

The effectiveness of the conductive spacer material in improving overall performance is higher when the membrane thermal conductivity between the two liquid menisci is lower. The region of the membrane cross section across which liquid is prevented from flowing will be referred to as the active layer 76 of the membrane (see FIGS. 39 and 40). Some membranes may additionally have a support layer 78. The support layer 78 is hydrophobic in FIG. 39 and hydrophilic in FIG. 40. A thinner membrane active layer 76 would allow more water flux, but also more heat loss. So with a thinner active layer 76, the preferred configuration may be air gap membrane distillation.

Figure 41:
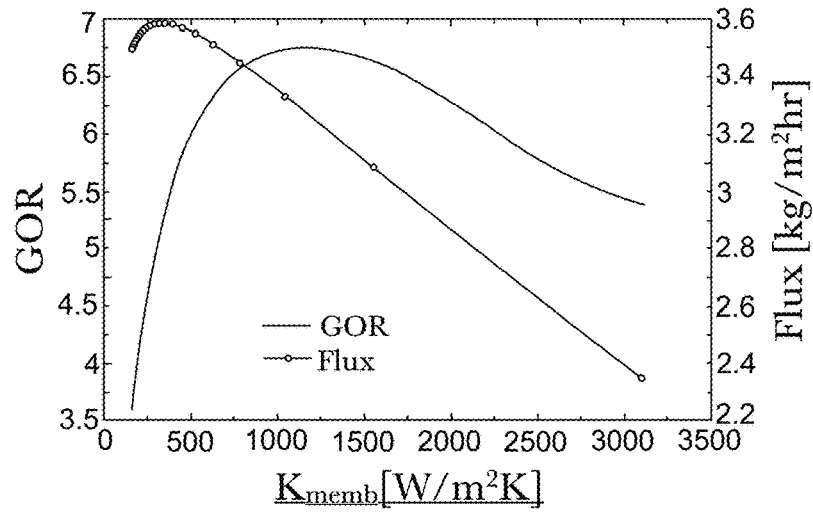
FIGS. 41 and 42 plot modeling results showing the tradeoffs associated with membrane thickness (represented by conductance values, $K_{memb}$) and the existence of an optimal thickness for maximizing GOR under CGMD conditions.
Figure 42:
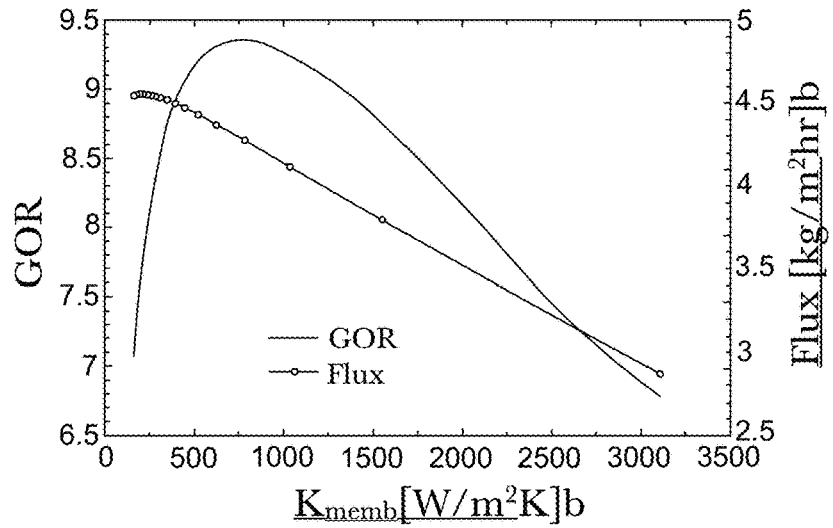
Figure 43:
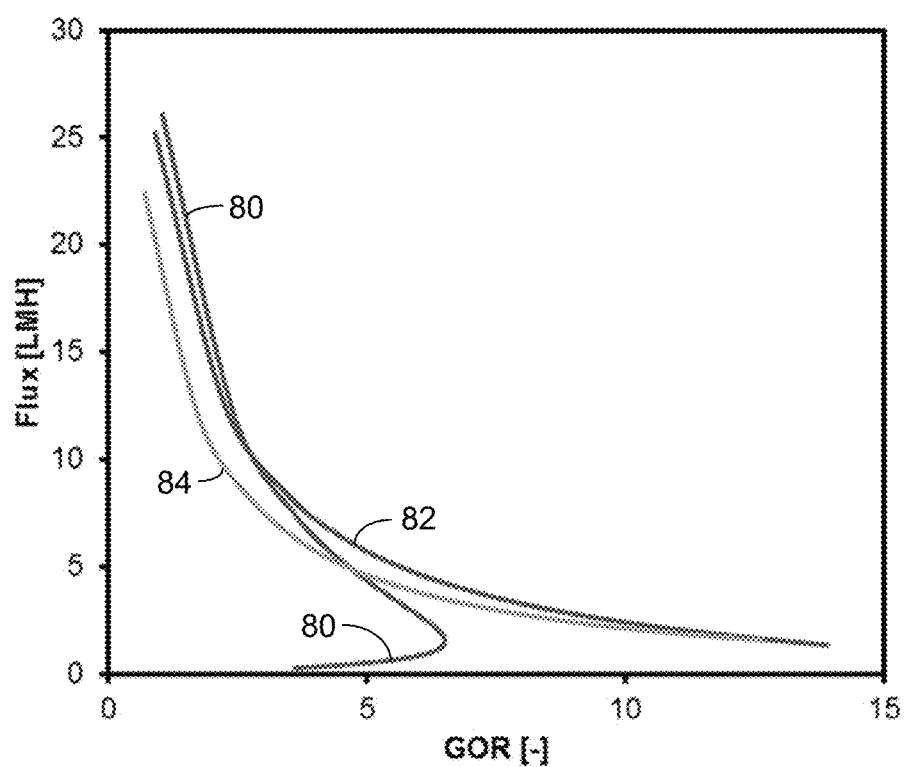
FIG. 43 is a plot of vapor flux versus GOR, showing that an optimal membrane thickness may exist for improving system performance.

In FIGS. 41 and 42, simple modeling results show the tradeoffs associated with membrane thickness (represented on the x axis by conductance values $K_{memb}$) and the existence of an optimal membrane thickness at least in terms of maximizing GOR. In FIG. 43, flux versus GOR in a CGMD module is plotted for a 20-μm-thick membrane 80, an 80-μm-thick membrane 82, and a 200-μm-thick membrane 84, where salinity of incoming feed liquid=35 parts per thousand (ppt), length [height (in the orientation shown) of the membrane and chambers]=0.5-12 m, and the average velocity of feed when it enters the module, $v_f$=8.3 cm/s. The membrane permeability, B, for the 20-μm membrane 80 was 80E-7 kg/m²·s·Pa; the membrane permeability, B, for the 80-μm membrane 82 was 16E-7 kg/m²·s·Pa; and the membrane permeability, B, for the 200-μm membrane 84 was 6.4E-7 kg/m²·s·Pa. As shown here, the 80-μm membrane 82 generally outperforms both the 20-μm and 200-μm membranes 80 and 84 in this example. Optimal membrane thickness will increase with an increase in feed salinity.

Results

Figure 8:
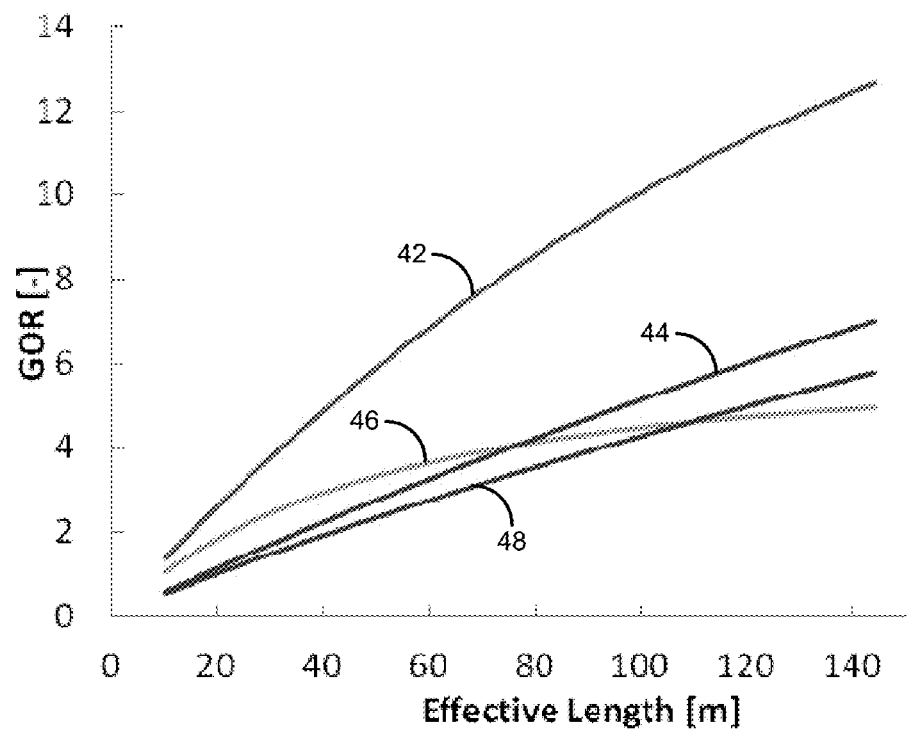
FIG. 8 is a chart providing a comparison of modeled energy efficiency between a proposed high-conductivity CGMD apparatus and other membrane distillation designs.

One embodiment of the CGMD apparatus uses an aluminum woven mesh as the thermally conductive material in the gap of an otherwise standard LGMD setup (FIG. 2). The results in terms of energy efficiency are shown in FIG. 8, where the gained output ratio (GOR) is shown as a function of effective length (in meters) (a) for CGMD with an aluminum spacer 42, (b) for PGMD 44, (c) for DCMD 46, and (d) for AGMD 48.

A partial implementation of the proposed system was tested in the Rohsenow Kendall Heat & Mass Transfer Lab at Massachusetts Institute of Technology where a conductive material was used in an AGMD experimental setup with a superhydrophobic heat-transfer plate. 15-30% improvement in flux was observed with this system, depending on the temperature of the feed solution, as compared to using a polypropylene mesh.

Comparisons with the Memsys multi-stage vacuum membrane distillation system were also carried out. Data on gained output ratio (GOR) values from the Memsys multi-stage vacuum membrane distillation system are reported in the literature. With the same membrane area and same water production rate, the GOR of the CGMD system described here was found to be 4.85 while the reported GOR of the Memsys system is about 3.5.

Figure 9:
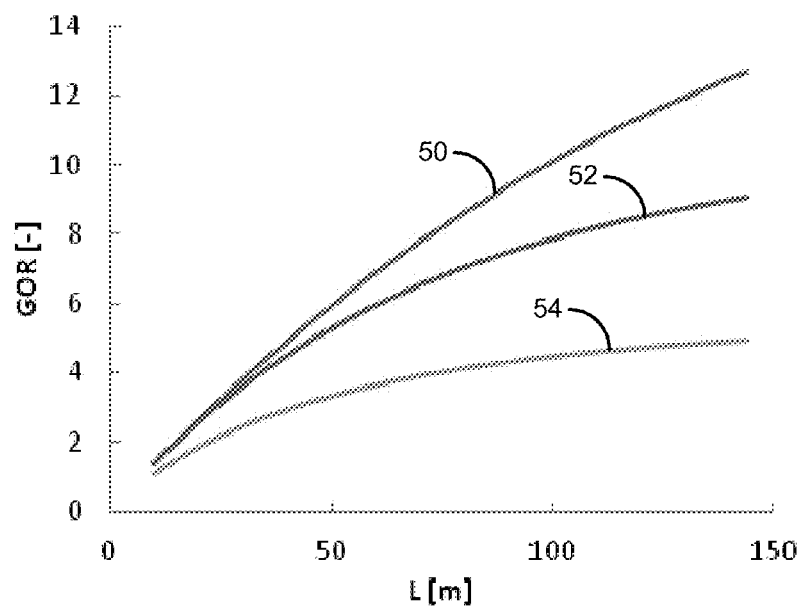
FIG. 9 is a chart providing a comparison of the efficiency of a high-conductivity CGMD apparatus with that of a DCMD system with an infinite heat exchanger area.

The DCMD system was modeled with a heat exchanger of 3K terminal temperature difference (TTD), which is a practical value. With an infinite heat exchanger area and 0K TTD, the GOR of the DCMD system would improve. FIG. 9, which plots the GOR (a) for CGMD with an aluminum thermally conductive material 50, (b) for DCMD (with a TTD of 0 K) 52, and (c) for DCMD (with a TTD of 3 K) 54, shows that the CGMD system still outperforms the DCMD system with an infinite area heat exchanger.

Figure 10:
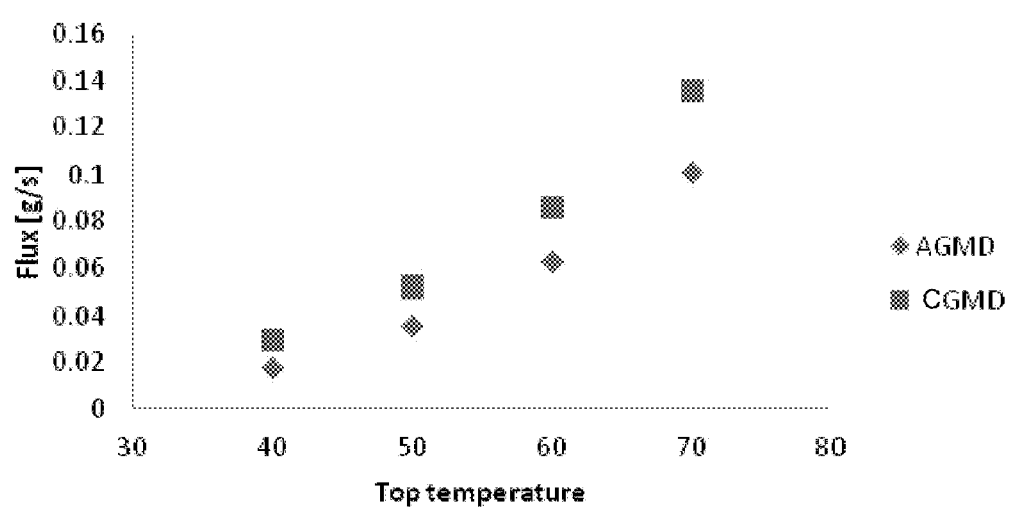
FIG. 10 is a chart showing the flux improvements, as a function of temperature, achieved with CGMD (in preliminary experiments) compared with those achieved with AGMD.

FIG. 10 shows the flux improvements, as a function of temperature, achieved with CGMD (squares) in preliminary experiments compared with those achieved with AGMD (diamonds).

Numerical Modeling

Several MD models with varying degrees of complexity have been developed to understand the effect of system parameters on flux. Fewer, however, have analyzed energy efficiency. The modeling approach followed here is very similar to that found in E. K. Summers, et al, "Energy efficiency comparison of single-stage membrane distillation (MD) desalination cycles in different configurations," Desalination 290 (2012) 54-66. As a result, only the new features of the modeling are discussed in detail.

A one-dimensional model of the MD modules is studied, where properties vary along the length of the module but are constant along the width (direction into the page). In the depth direction, property variations due to transport processes are evaluated by considering the temperature and concentration boundary layers. The bulk properties of the fluids are assumed equal to the value at the fluid interior; the boundary layers are assumed to be thin, but not negligible. Mass and energy conservation equations are solved for each computational cell coupled with property evaluations performed using built-in functions on Engineering Equation Solver (EES) (S. A. Klein, Engineering equation solver version 9, <http://www.fchart.com/ees/>).

Figure 11:
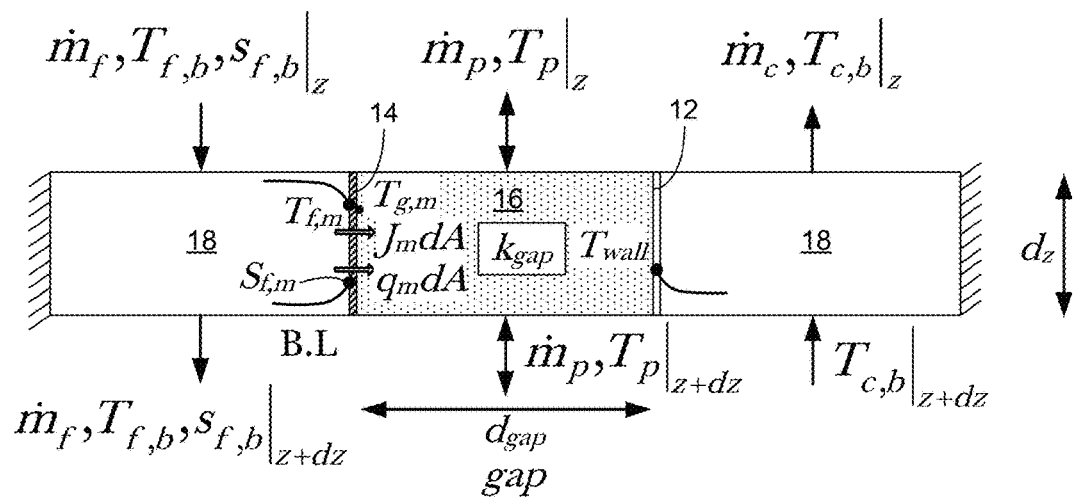
FIG. 11 shows a PGMD computational cell.

The overall computational cell is shown in FIG. 11, where $\dot{m}$ is the mass low rate (kg/s); T is temperature (° C.); s is salinity (g/kg); B is membrane permeability (kg/m²·s·Pa); L is the length of the module; J is the permeate flux (kg/m²·s); A is the membrane area (m²); dA is elemental area (m²) and q is heat. In the subscripts, b is stream bulk; c is the cold stream; f is the feed (hot) stream; m is the membrane surface; P is the product stream; and wall is the condensing surface.

Modeling of the feed channel is common to both configurations. A concentration boundary layer is incorporated into the feed channel model to account for desalination of salt water and capture second order effects associated with salinity of the feed. The film model of concentration polarization (Eq. 4) is used to relate the salt concentrations at the membrane interface ($c_{f,m}$) to the bulk concentration ($c_{f,b}$), effective mass transfer coefficient (k) in the channel and vapor flux thorough the membrane (J):

$$\frac{c_{f,m}}{c_{f,b}} = \exp\left(\frac{J}{\rho_f k_{mass}}\right), \quad (4)$$

where c is the salt concentration (g/kg); $\rho_f$ is the density of the feed; and $k_{mass}$ is the mass transfer coefficient (m/s).

The effect of dissolved salt on the vapor pressure of water ($p_{f,m}^{vap}$) is captured using Raoult's law (Eq. 5):

$$p_{f,m}^{vap} = P_{sat}(T_{f,m}) \times \left(1 - \frac{\frac{2c_{f,m}}{MW_{solute}}}{\frac{2c_{f,m}}{MW_{solute}} - \frac{1000 - c_{f,m}}{MW_{water}}}\right), \quad (5)$$

where MW is molar mass (kg/mol) and sat indicates saturation.

The difference in vapor pressure across the membrane is the driving force for water vapor transfer, as shown in FIG. 11. The effect of salt content on the enthalpy of the feed solution is not modeled in detail since we are focusing on low salinity conditions where these secondary effects are negligible. The effect of salt on other thermophysical properties of the streams is not modeled. At close to seawater salinities considered in this study, the reduction in vapor pressure is the only thermally significant effect.

The flux, J, through the membrane is calculated locally from the vapor pressure difference and the membrane permeability coefficient, B:

$$J = B \times (p_{f,m}^{vap} - p_{g,m}^{vap}), \quad (6)$$

The region between the membrane and the condensing surface will be referred to as the gap. For air gap, E. K. Summers, et al., "A novel solar-driven air gap membrane distillation system," 51 Desalination and Water Treatment 1-8 (2012), presented a vapor diffusion with air counter diffusion model. For PGMD and CGMD, similar to the case of DCMD, vapor condenses immediately upon exiting the membrane pores into a stream of pure water. From here, the heat is convected across the gap into the condensing surface. In this study, the water flow rate is assumed to be relatively low and, hence, energy transfer across the gap is approximated by conduction across the gap, as expressed in Eq. 7:

$$\dot{q}_{gap} = \frac{k_{gap}}{d_{gap}} \times (T_{g,m} - T_{wall}), \quad (7)$$

where $\dot{q}_{gap}$ is the heat flux across the gap.

Figure 14:
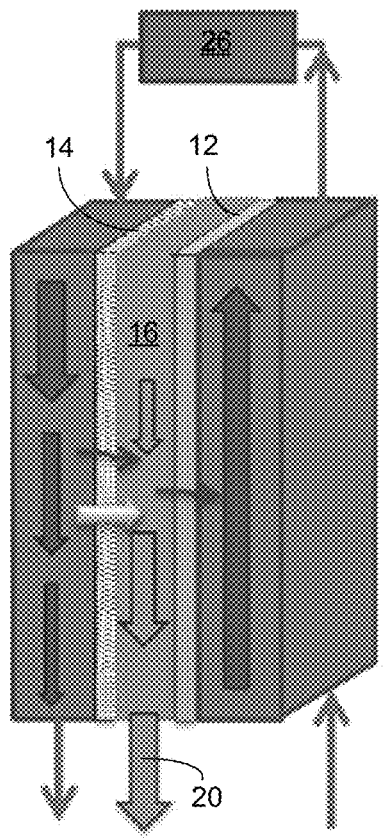
FIG. 14 illustrates a counterflow configuration in the gap region.
Figure 15:
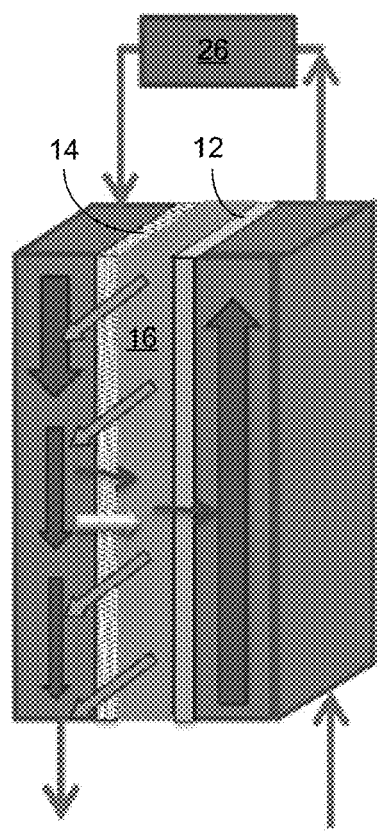
FIG. 15 illustrates a crossflow configuration in the gap region.
Figure 16:
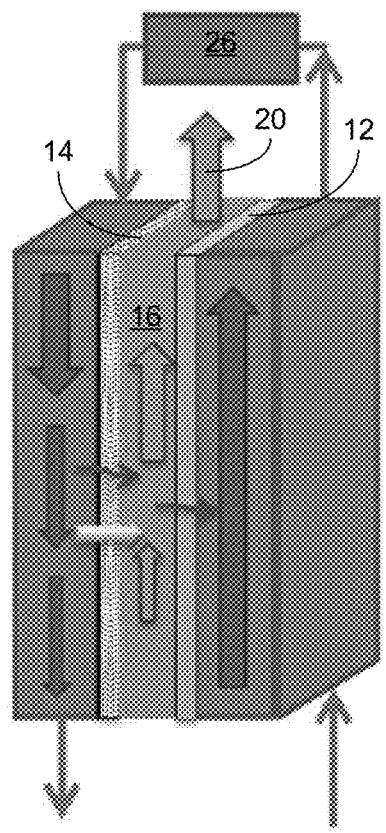
FIG. 16 illustrates a parallel flow configuration in the gap region.

Depending on the direction of water flow in the gap, $\dot{q}_{gap}$ would be different. In the case of a system designed similarly to a spiral wound MD system, for example, the flow of water axially between the computational cells in the gap may be neglected. All the water produced at any given location along the length would flow perpendicularly out of the module (in this case, into or out of the plane of the paper, as shown in FIGS. 14-16). On the other hand, the flow can also be countercurrent to the cold stream or parallel to the flow stream. The corresponding equations for cell number, n, are given below (where cell number 1 is at the hot side):

$$\dot{q}_{gap,cross}{}^n = J''h_v(T_{f,m}{}^n) + q_m{}^n - J''h_l(T_p{}^n)$$

$$\dot{q}_{gap,countercurrent}{}^n = J''h_v(T_{f,m}{}^n) + q_m{}^n[\dot{m}_p{}^{n-1}h_l(T_p{}^{n-1}) - \dot{m}_p{}^n h_l(T_p{}^n)]/dA$$

$$\dot{q}_{gap,parallel}{}^n = J''h_v(T_{f,m}{}^n) + q_m{}^n + [\dot{m}_p{}^{n+1}h_l(T_p{}^{n+1}) - \dot{m}_p{}^n h_l(T_p{}^n)]/dA, \quad (8)$$

where $h_v$ is the specific enthalpy of the vapor, and $h_l$ is the specific enthalpy of the liquid.

In the case of PGMD, the gap is filled with water with some plastic spacers often used to support the membrane. On the other hand, in the case of conductive gap MD, conductive materials are used to enhance the conductivity of the region. The effective thermal conductivity of this gap ($k_{gap}$) would therefore be a function of the conductivities of water and additional material in the gap as well porosity and geometry of the region. In this study, $k_{gap}$=0.6 W/m-K is used for PGMD, and $k_{gap}$=10 W/m-K is used for reporting CGMD results.

The baseline conditions for the numerical model are shown in Table 1, where $k_m$, $\phi_m$, and $d_m$ respectively represent the membrane thermal conductivity, porosity, and thickness.

TABLE 1

| No. | Variable | Value | Units |
|---|---|---|---|
| 1 | $T_{f,in}$ | 85 | ° C. |
| 2 | $T_{c,in}$ | 27 | ° C. |
| 3 | $\dot{m}_{f,in}$ | 1 | kg/s |
| 4 | $c_{f,in}$ | 35 | ppt |
| 5 | L | 60 | m |
| 6 | w | 0.7 | m |
| 7 | $d_f$, $d_c$ | 0.004 | m |
| 8 | $d_{gap}$ | 0.001 | m |
| 9 | $k_{gap}$(PGMD) | 0.6 | W/m-K |
| 10 | $k_{gap}$(CGMD) | 10 | W/m-K |
| 11 | B | 16 × 10$^{-7}$ | kg/m² s Pa |
| 12 | $k_m$ | 0.2 | W/m-K |
| 13 | $\phi_m$ | 0.8 | — |
| 14 | $d_m$ | 200 | μm |

Validation:

The numerical modeling framework presented above has been validated for AGMD and DCMD in the past. PGMD experiments were carried out using the AGMD apparatus described in detail elsewhere in D. E. M. Warsinger, et al., "Effect of module inclination angle on air gap membrane distillation," Proceedings of the 15th International Heat Transfer Conference, IHTC-15, Paper No. IHTC15-9351, Kyoto, Japan August 2014, and in J. Swaminathan, "Numerical and experimental investigation of membrane distillation flux and energy efficiency," Master's thesis, Massachusetts Institute of Technology (2014). The apparatus was used to study PGMD by collecting water from the top, hydrostatically forcing the gap region to be flooded with pure water. Experiments were conducted at different values of $T_{f,in}$ (40, 50, 60, 70° C.) and $T_{c,in}$ (17, 20, 25° C.). For the numerical model predictions, an effective gap conductivity of $k_{gap}$=0:6 W/m-K and effective gap thickness of 1 mm were used. Under similar conditions compared to PGMD, the flux for AGMD is about 20% lower at higher $T_{f,in}$ and more than 50% lower at lower temperatures. This result is comparable to results in the literature that show that flux for liquid gap MD is higher than that of AGMD. The magnitude of improvement in this study may be smaller since a smaller gap thickness is used, resulting in lower resistance in the case of AGMD.

Figure 12:
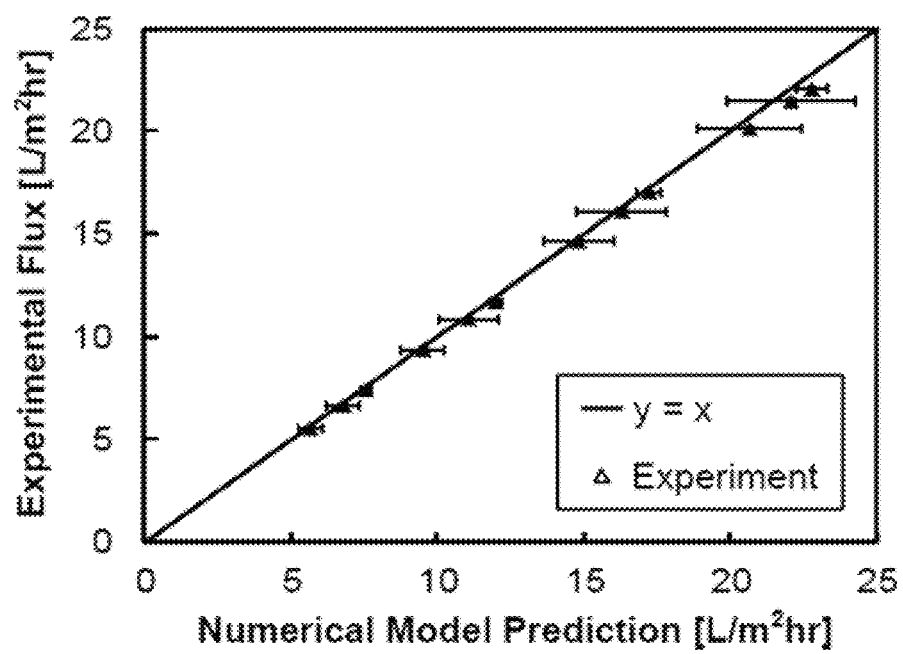
FIG. 12 plots empirical flux in comparison with numerical modeling results.

The results comparing the numerical modeling predictions against the experimental results are shown in FIG. 12. Each set of three data points corresponds to one value of hot side temperature.

Figure 13:
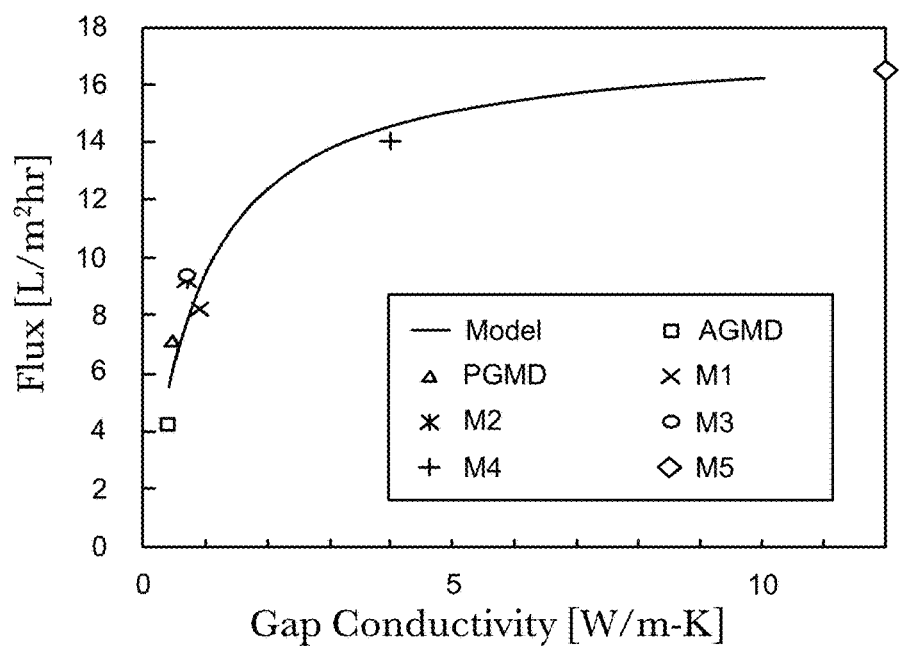
FIG. 13 plots experimental flux measurements at different values of gap conductivity.

Further validation of the model for the effect of gap conductivity in a CGMD configuration was carried out using a modified Sterlitech apparatus described in F. Al Marzooqi, et al., "Flux measurements in novel membrane distillation configurations," Proceedings of The International Desalination Association World Congress on Desalination and Water Reuse, San Diego, Calif., USA (2015), and the results are shown in FIG. 13. In the Figure, M1 to M5 correspond to different types of metal meshes used in the gap which is about 2-4 mm thick. M1 to M3 are woven aluminum mesh spacers (McMaster-Carr part numbers 9227T53, 9227T56, 9227T57). M4 is a porous Duocel Aluminum material (ERGAerospace part number 6101-T6) hammered down to half its thickness and covered by a thin brass mesh to protect the membrane. M5 is a specially manufactured copper plate with fins. The gap conductivity in the case of M5 is likely to be much higher, but since the increase in flux is negligible at higher conductivities, the point is plotted at the edge of the plot.

These results are also in overall agreement with flux results presented by Francis, et al., "Material gap membrane distillation: A new design for water vapor flux enhancement," 448 Journal of Membrane Science 240-247 (2013), on material gap MD configurations. With the introduction of sand that has lower thermal conductivity than water, the flux was found to be lower than with only water in the gap. The opposite effect is observed in terms of flux for CGMD.

Results and Discussion

The configuration of pure water flow in the gap can affect the performance of a PGMD or CGMD system. FIGS. 14-16 shows the different options for pure water flow in the gap. On the left, pure water in the gap flows countercurrent to the coolant fluid across the condensing plate. The opposite gap configuration is to have the pure water flow parallel to the coolant stream, as seen on the right. An intermediate design (middle) may be that of perpendicular or crossflow, which would be similar to the flow pattern in a spiral-wound system, where water flows in direction perpendicular to that of cold water flow and leaves the module at several positions along the length of the module.

The system with gap flow countercurrent to the cold stream (left) is likely to have the highest energy efficiency since the pure water would leave the system close to the cold stream inlet temperature; this is similar to the well-known behavior of a counterflow heat exchanger. On the other hand, the parallel configuration (FIG. 16) would be rejecting a warm pure water stream close to the top temperature. Even though the amount of water released is less than 8% of the feed stream, it can still have a detrimental effect on energy efficiency. The perpendicular configuration is likely to lie in between, since water is released both at warmer temperatures and cooler temperatures, and hence on average the stream is going to be of intermediate temperature.

Figure 17:
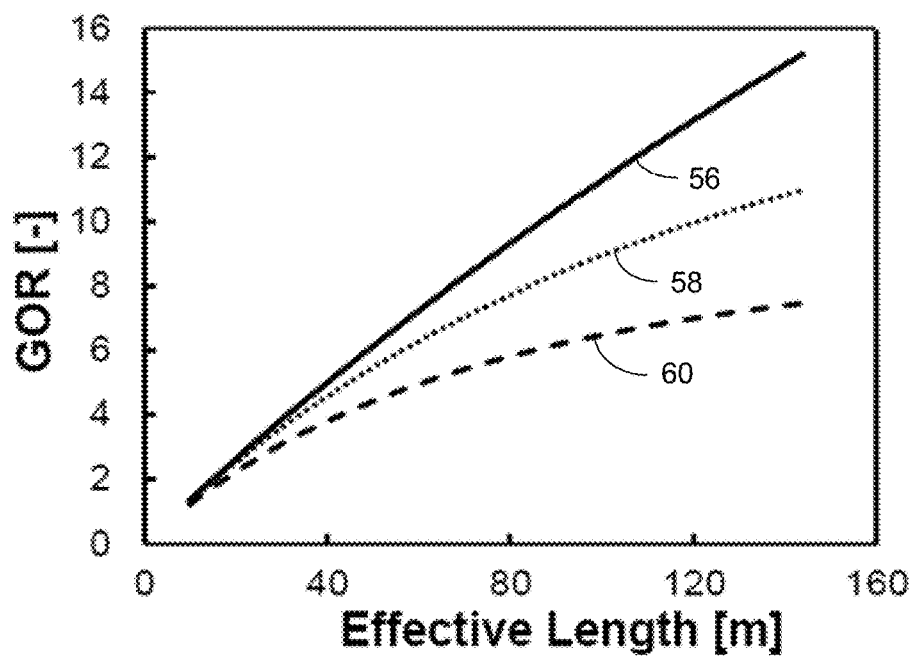
FIG. 17 plots the gained out ratio (GOR) as a function of the effective length of the system and the effect of gap flow direction on CGMD.
Figure 18:
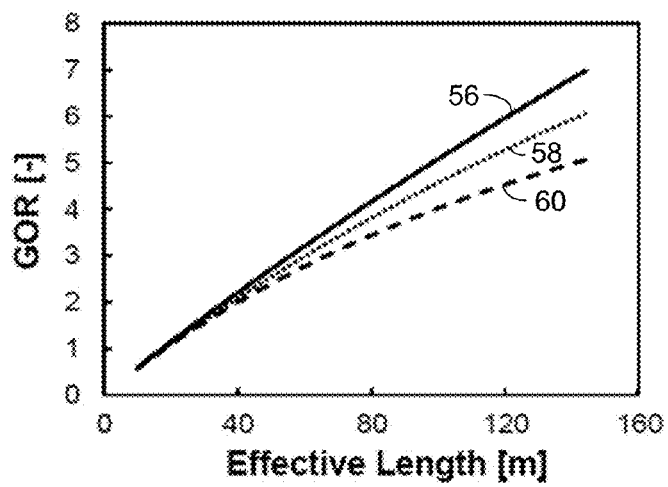
FIG. 18 plots the gained out ratio (GOR) as a function of the effective length of the system and the effect of gap flow direction on PGMD.

The effect of length on GOR is shown for all three flow orientations (counterflow/countercurrent 56, crossflow/perpendicular 58, and parallel 60) in FIG. 17 (for CGMD) and 18 (for PGMD). The GOR trend is as expected. At L=60 m, the GOR differs by about 1 between parallel 60 and perpendicular 58 and between perpendicular 58 and countercurrent 56 for CGMD systems (FIG. 17). The trend is similar for PGMD systems, but the difference in magnitude of GOR differences is much smaller at about 0.2. The flux at L=60 m, is 5.56 L/m$^2$-hr for PGMD and 6.21 L/m2-hr for CGMD in countercurrent configuration.

Comparing the graphs with data from E. K. Summers, et al., "Energy efficiency comparison of single stage membrane distillation (MD) desalination cycles in different configurations," 290 Desalination 54-66 (30 Mar. 2012), for AGMD, DCMD and VMD systems over the same operating conditions, GOR of PGMD is about 20% higher than that of AGMD across the range of lengths. The GOR of CGMD in turn is about two times higher than that of PGMD.

Figure 19:
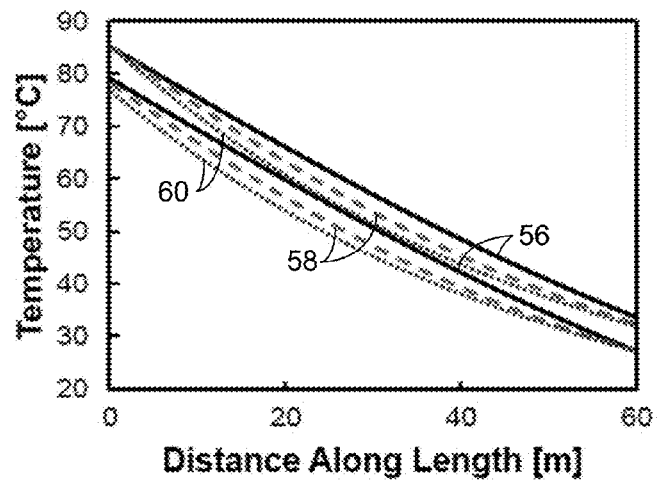
FIG. 19 plots hot and cold side bulk temperature profiles for different flow configurations and the effect of gap flow direction on temperature profile in CGMD.
Figure 20:
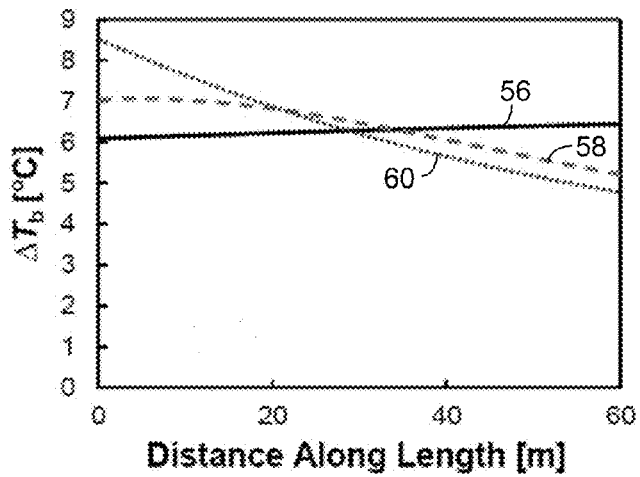
FIG. 20 plots the temperature difference between the streams along the module and the effect of gap flow direction on temperature profile in CGMD.

FIG. 19 shows the bulk stream temperature profiles within the module for the three different flow orientations when L=60 m. The temperature profiles are more straight for the counterflow 56 case than the crossflow 58 and parallel 60 arrangements. The cold stream leaves at a higher temperature in the case of the counterflow configuration 56. This means that better preheating is achieved; and, hence, less heat will be added from the heater 26, contributing to a higher GOR. FIG. 20 shows the driving temperature difference between the hot and cold stream bulk temperatures along the length of the module. Interestingly, in counterflow design 56, the pinch point temperature difference occurs at the hot side, leading to lower external heat input, whereas in both the other configurations, the pinch point occurs at the cold end. The driving force is also relatively more constant in the counterflow design 56, contributing to lower entropy generation within the module and better overall energy efficiency.

The following results and discussions will focus on the counterflow configuration 56. The trends will be relatively similar for other flow configurations as well.

Figure 21:
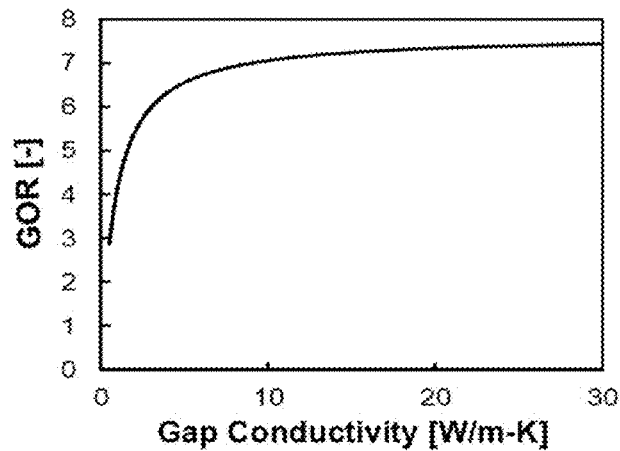
FIG. 21 plots energy efficiency in terms of gained output ratio versus gap conductivity.

FIG. 21 shows the effect of gap conductivity on GOR. $k_{gap}$ is varied over a range of 0.5 W/m-K to more than 30 W/m-K. At lower $k_{gap}$, an increase in the conductivity leads to significant improvements in GOR (FIG. 21) whereas beyond about $k_{gap}$=10 W/m-K, increase in conductivity doesn't result in much further improvement.

Figure 22:
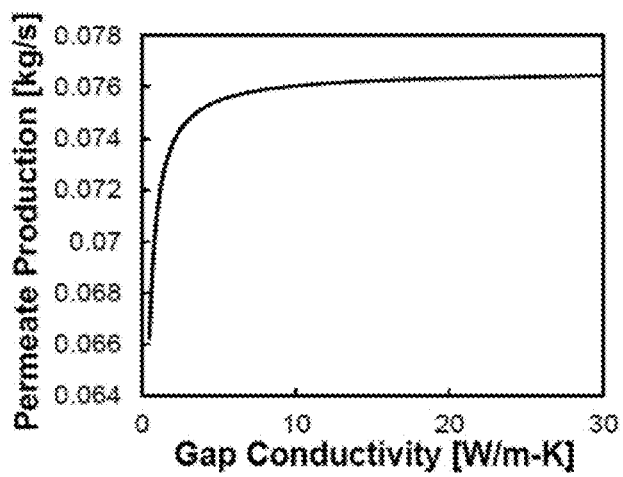
FIG. 22 plots water production in terms of permeate production versus gap conductivity.
Figure 23:
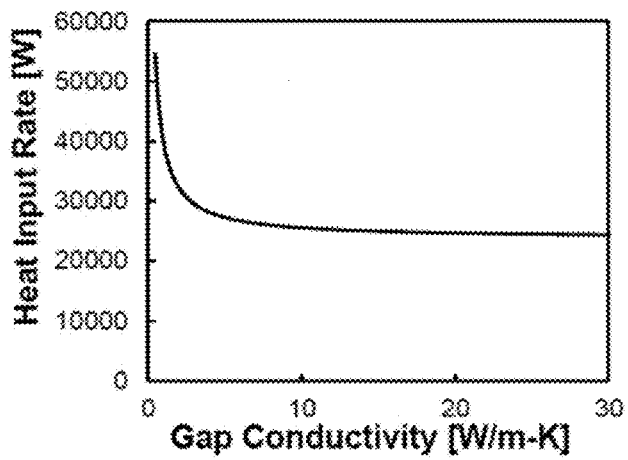
FIG. 23 plots heat input in terms of the heat input rate versus gap conductivity.

FIGS. 22 and 23 illustrate the effect of $k_{gap}$ on water production, $\dot{m}_p$ (FIG. 22), and heat input, $\dot{Q}_h$ (FIG. 23). $\dot{m}_p$ increases and $\dot{Q}_h$ decreases, both leading to an improvement in GOR. Among the two, the increase in $\dot{m}_p$ is about 15% whereas the decrease in $\dot{Q}_h$ is around 60%. Together, both of these effects result in the nearly 100% higher GOR for CGMD compared to PGMD, as $k_{gap}$ increases from about 0.6 to 10 W/m-K.

Figure 24:
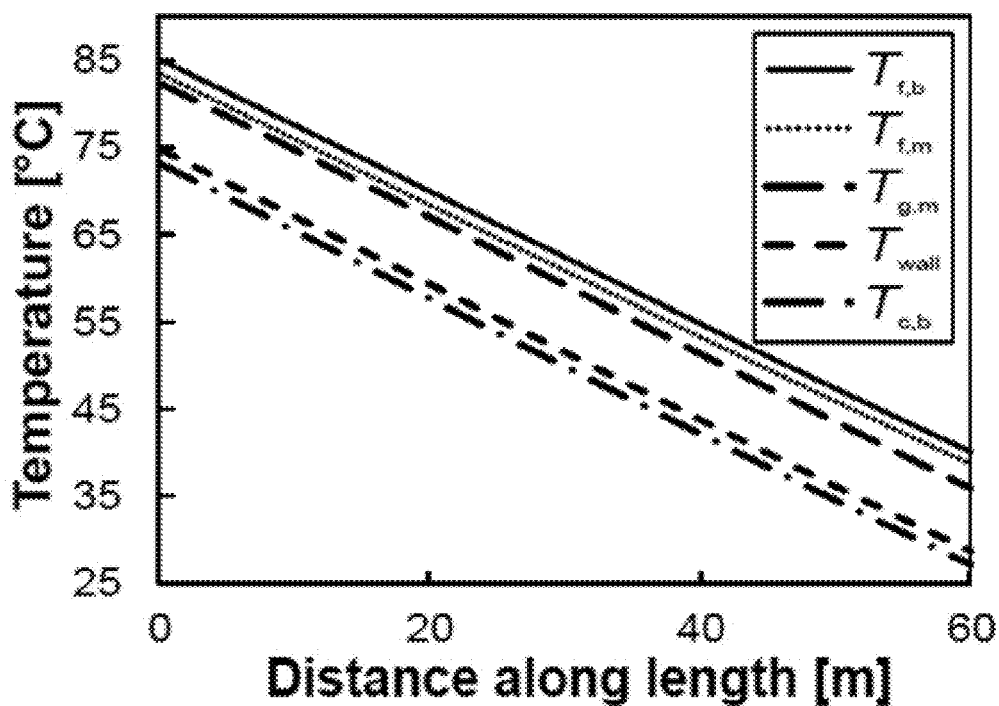
FIG. 24 plots the temperature profile along the length of a PGMD system.
Figure 25:
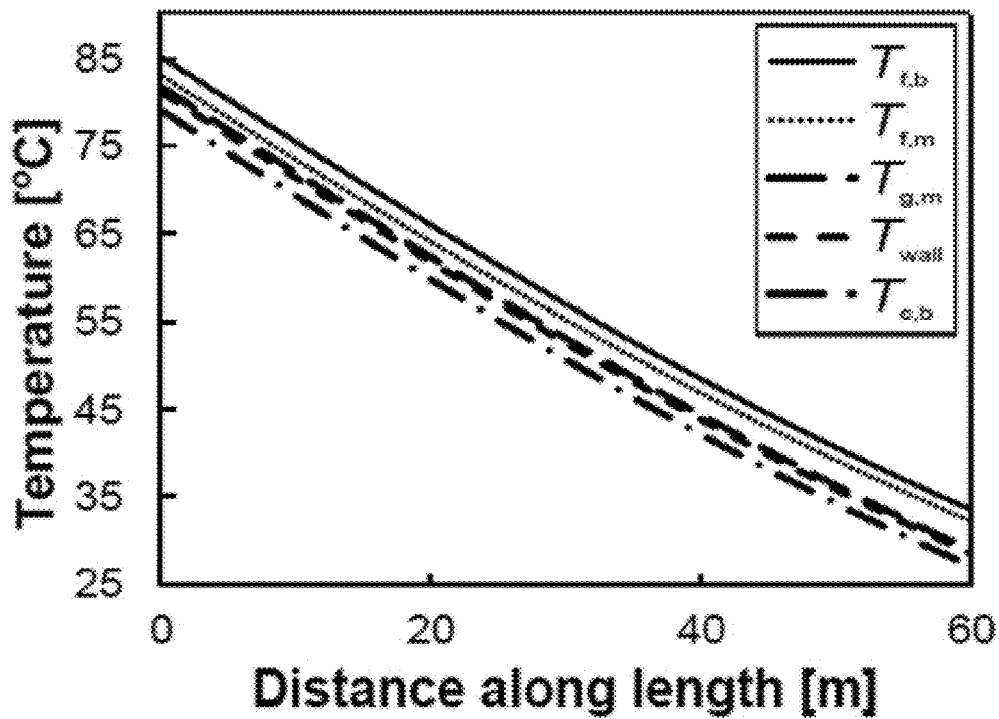
FIG. 25 plots the temperature profile along the length of a CGMD system.

The temperature profiles within the modules are illustrated in FIGS. 24 and 25 and help explain the results physically. For PGMD, a relatively large difference in temperature is observed between the membrane surface and the condensation plate. As a result, there is a smaller temperature difference across the membrane leading to lesser pure water production, even though the overall pinch point temperature difference between the bulk streams is much larger compared to the profile for CGMD. On the other hand, since the pinch point temperature difference is smaller in CGMD, lesser external energy supply was required too.

Conclusions:

Numerical modeling shows that PGMD systems have higher GOR than AGMD. The proposed CGMD configuration with a high thermal conductivity gap can have two times higher GOR than even PGMD. Pure water flow in the gap countercurrent to the cold stream leads to highest energy efficiency followed in order of efficiency by crossflow and parallel configurations. An increase in gap conductivity improves permeate production and GOR, with diminishing returns beyond k≈10 W/m-K in the cases considered here. The main reason for improved GOR of CGMD is better energy recovery into the cold stream within the MD module.

Figure 26:
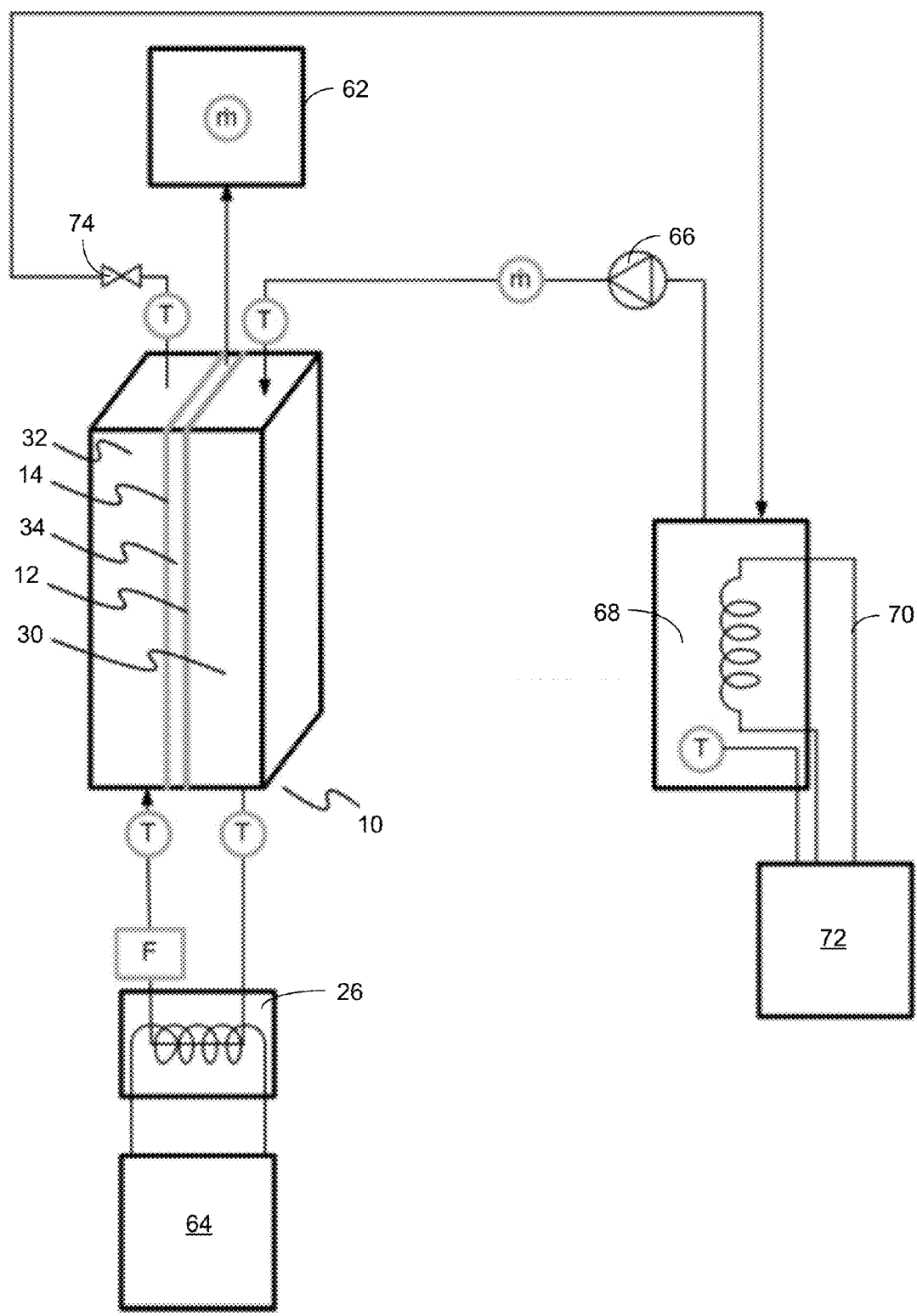
FIG. 26 is a schematic diagram of an experimental distillation apparatus.

Additional Experimental Procedure:

A schematic diagram of the experimental apparatus is shown in FIG. 26. The feed water (0.1% NaCl solution to enable leak detection) is pumped via a feed pump 66 from a reservoir 68 through the cold side (first feed liquid chamber 30) to cool the condensing plate 12 before being passed through a heater 26. The heat supply from the heater 26 is controlled using a variable voltage controller 64. This heated water is then passed on the other side (second feed liquid chamber 32) of the module 10 over the MD membrane 14, counter-flow to the cold flow. The feed water is then passed through a flow valve 74 back into the feed reservoir 68, which is cooled via a chiller coil 70 operated by a controller 72 to maintain the liquid in the feed reservoir 68 at a constant temperature. In the apparatus, temperature sensors are designated with a T; flow-rate sensors are designated with a $\dot{m}$; and filters are designated with a F.

In this apparatus, the gap 34 between the MD membrane 14 and the condensing plate 12 was modified to conduct experiments on AGMD, PGMD, and CGMD configurations. For AGMD, a plastic woven mesh is placed in the gap 34. For PGMD, the same plastic woven mesh is used to support the mesh, and water is now collected from the top with the bottom sealed so that the gap 34 fills with liquid water. In the case of CGMD, in addition to collecting water from the top, the plastic mesh is replaced by a metal mesh.

During operation, fiberglass insulation was used on the inlets and exits to the heater 26, and foam insulation was applied on the outer surface of the heater 26 to reduce the heat loss to the environment. The feed stream is circulated using a magnetic drive pump 66 with no metallic parts exposed to the fluid. A low mass flow rate was achieved using the needle valve 74 at the outlet of the module 10 just before the flow returns to the feed water reservoir 68. Therefore, most of the pressure drop occurs after the feed stream leaves the MD module 10, which keeps the static pressure inside the module 10 high enough to maintain a flat membrane 14. Feed flow rate was measured by collecting the feed for a known time interval (e.g., 50 sec.) and measuring its weight using a scale with 0.01 g accuracy. Permeate flow rate was calculated in a similar manner. Temperatures were measured using type T thermocouples with 1° C. accuracy. A cloth filter, F, was used following the heater 26 before flow entered the hot side 32 of the MD module 10 to prevent deposition of rust particulates from the heater 26 on the membrane 14 and leading to membrane wetting.

Experiments were carried out under the same heater energy input conditions while varying the feed mass flow rate for each configuration, with different mesh sizes in the gap 34.

Results:

While the air gap was modeled as shown in E. K. Summers, et al., "Energy efficiency comparison of single-stage membrane distillation (MD) desalination cycles in different configurations," 290 Desalination 54-66 (2012), for the permeate gap and the conductive gap configurations the flow of pure water through the gap was neglected and the heat transfer through the gap is approximated as conduction between the membrane and condensing surface. The total length of the channel was 0.85 m, the width is 0.05 m, and the channel depth is 0.035 m. The channels were arranged such that the hot and cold fluid streams are in a counterflow orientation. The simulations were conducted at a constant power input of 90 W. The effective conductivity of the permeate gap was set as 0.6 W/m·K, whereas for the conductive gap case, an effective conductivity of 10 W/m·K was used, which refer to the best case scenario values for $k_{gap}$. As highlighted earlier, with the simple woven meshes, the conductivity in the permeate gap experiments is likely to be approximately 0.5 W/m·K, and about 0.9 W/m·K rather than 10 W/m·K in the copper mesh CGMD experiments. These results are then compared with the best-case scenarios to determine the trends and evaluate how much further improvement is possible.

Figure 27:
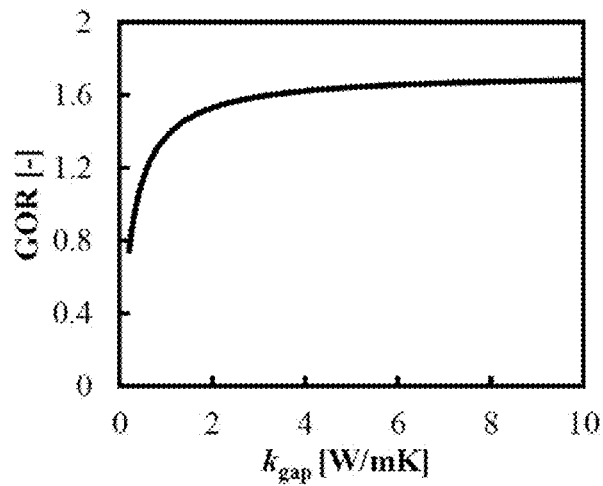
FIG. 27 is a plot from a numerical model of the effect of $kg_{ap}$ on GOR, where $\dot{m}_f = 1$ g/s and $d_{gap} = 1.24$ mm.

FIG. 27 shows the numerical modeling prediction on the effect of gap thermal conductivity on GOR. At lower values of $k_{gap}$, up to about 4 W/m·K, a steep increase in GOR is predicted, followed by diminishing returns beyond this point. The exact number is a function of the relative dominance of the gap resistance among other thermal resistances between the hot and cold fluids. One can observe that an ideal CGMD process should have about twice as much GOR as that of AGMD, when all other parameters are held constant.

Figure 28:
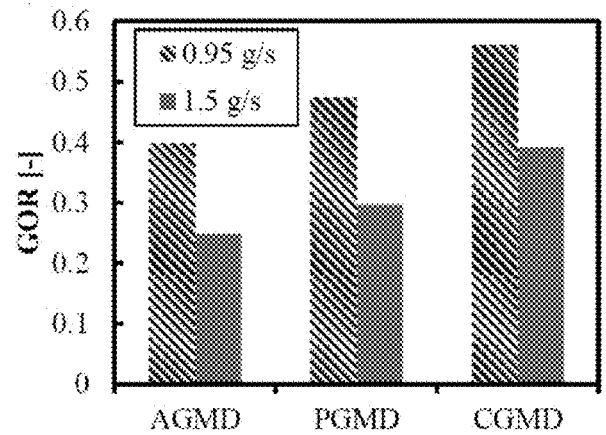
FIG. 28 is a plot of experimental GOR at $d_{gap} = 1.24$ mm for AGMD, PGMD and CGMD and two feed flow rates (i.e., 0.95 g/s and 1.5 g/s).

FIG. 28 shows experimental results on the effect of gap configuration on GOR at two values of feed flow rate. Under both flow rate conditions, an increasing trend of GOR is observed between the AGMD, PGMD, and CGMD configurations. The magnitude of increase in GOR between AGMD and CGMD is between 40 to 60%, whereas between AGMD and PGMD it is about 20%. The flux at a GOR of 0.3 is 2.43 LMH. The heat supply rate was held constant at 174 W in all the experiments and so the GOR is a linear function of the flux.

Figure 29:
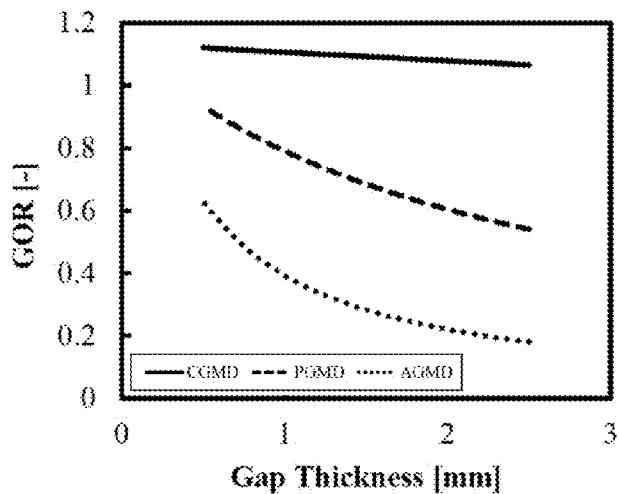
FIG. 29 is a plot of numerical modeling predictions on the effect of gap thickness on GOR ($\dot{m}_f = 1.5$ g/s).
Figure 30:
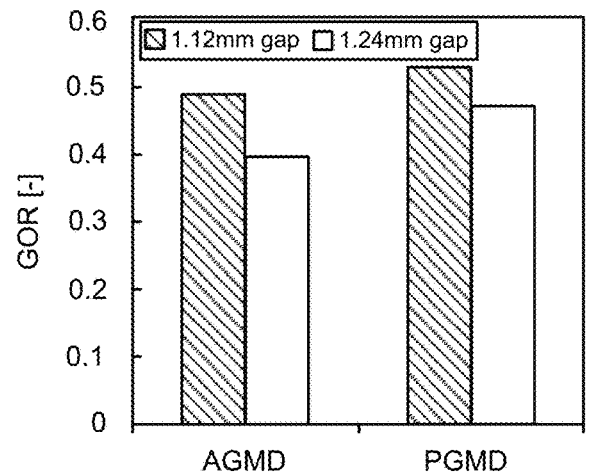
FIG. 30 is a plot of experimental results on the effect of gap thickness on AGMD and PGMD performance at $\dot{m}_f = 0.95$ g/s for a 1.12 mm gap and for a 1.24 mm gap.

As noted, infra, another method to affect the process performance by changing gap conductance is to change $d_{gap}$. FIG. 29 shows that lower $d_{gap}$ leads to a higher GOR for all configurations. In the case of CGMD, the improvement is less pronounced as the increase in $h_{gap}$ does not affect the total resistance much because of the aforementioned diminishing returns, as the gap is no longer a major resistance. It should be noted that while AGMD and PGMD perform worse at higher $d_{gap}$, at lower gap thicknesses their performance approaches that of CGMD. Practical constraints such as the pressure drop for the permeate flow will set the lower limit on $d_{gap}$ in these cases.

Experimentally, mesh thickness effectively sets the gap thickness. Energy efficiency using a mesh thickness of 1.12 mm was found to be higher than using a 1.24 mm thick mesh. As predicted by the model, the improvement in GOR was higher for AGMD than for PGMD, 23% compared to 12%, while the magnitudes of GOR in the PGMD case were higher.

Figure 31:
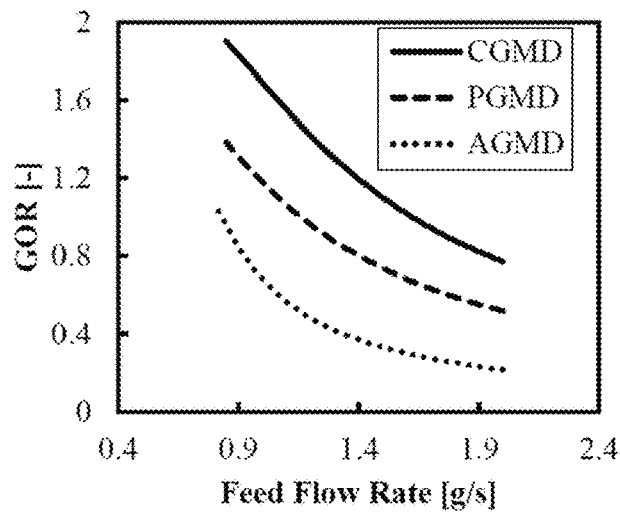
FIG. 31 is a plot of numerical model predictions on GOR as a function of feed flow rate for CGMD, PGMD, and AGMD.

FIG. 31 shows numerical modeling results on the effect of feed flow rate on GOR. In all three configurations, a smaller feed flow rate leads to a higher GOR due to better energy regeneration in the MD module [larger total heat exchange area (NTU) for the same area and transfer coefficient]. Also the GOR increases exponentially as we get to very small flow rates, and is limited only by the increase in flow boundary layer resistances to heat and mass transfer.

Figure 32:
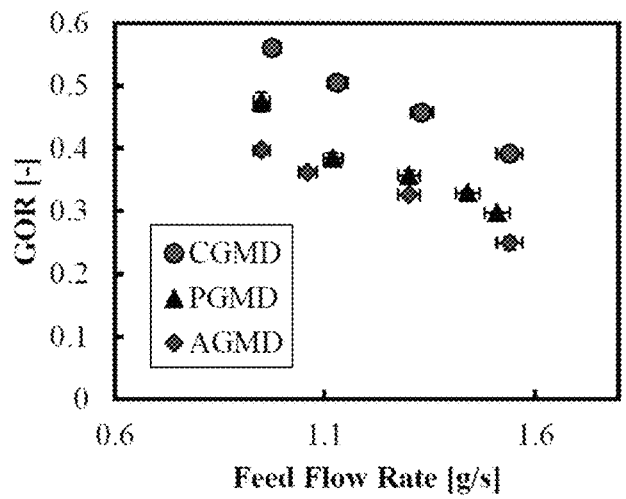
FIG. 32 is a plot of experimental GOR as a function of flow rate for CGMD, PGMD, and AGMD, where $d_{gap} = 1.24$ mm.

Experimentally, a similar trend is observed in terms of the effect of feed flow rate (FIG. 32). At lower feed mass flow rates, for the same external heat input, the feed stream is heated more as it leaves the cold channel leading to higher top temperature and higher water permeate production rate. The reason why CGMD performs better at any given flow rate is also similar. For the same set of inlet conditions and heat input, the CGMD system has better internal heat transfer coefficients, enabling more heat transfer in the module leading to better preheating of the cold stream. As a result, the cold outlet stream temperature is higher in CGMD compared to PGMD which in turn is higher than AGMD. Since the heat input is constant, this leads to a higher top temperature in CGMD and therefore higher flux and pure water production rates. This experimentally observed mechanism is also numerically verified.

Results:

While the results in preceding section are consistent with those from the numerical model, on average the absolute magnitude of the numerically predicted GORs is about twice that of the experimentally observed GORs. This section discusses some of the reasons for this mismatch.

The two major reasons for the mismatch between experiments and the model are believed to be heat losses to the environment, which are neglected in the model, and cross-conductance in the condensing plate due to compact module design. In addition to these reasons, the reason for the relative improvement in CGMD performance in the experiment being lower than that predicted numerically has been explained briefly in terms of the actual effective thermal conductivity of the mesh spacer used for CGMD being much below the value of 10 W/m·K assumed in the model.

For MD installations of small membrane area, the feed flow rate is targeted to be low as described in the preceding section. This low feed rate can be understood based on the fact that MD flux is likely to be about 2-4 L/m² hr for a well-designed system with energy recovery. As a result, for smaller membrane area systems, the feed flow rate is scaled down in order to achieve a good recovery ratio in the module.

Figure 33:
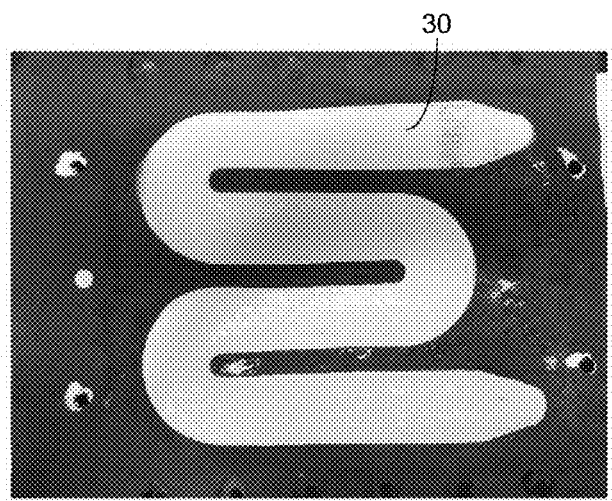
FIG. 33 is an image of an embodiment of a serpentine feed flow channel geometry.

Lower feed and coolant flow rates lead to higher temperature and concentration polarization in these channels. In order to accommodate a longer channel within the feed and cold side plates, a serpentine/circuitous flow path 30 was used, as shown in FIG. 33. This geometry leads to cross conduction in the copper condensing plate (tendency of a system to reach thermal equilibrium) leading to the MD module's departure from counter-flow behavior thereby degrading heat recovery substantially.

In the numerical model, heat loss to the environment was neglected. The channel was machined out of Delrin plates of 2.54 mm thickness to provide insulation. Additionally, external insulation was used but did not cover the module uniformly. The heat loss to the environment scales as $Q_{loss}=h_{eff}A_s\Delta T_{eff}$, where $h_{eff}$ and $\Delta T_{eff}$ are effective heat transfer coefficient and temperature difference associated with the heat loss. The effective heat transfer coefficient is the effective conductance of a series network of forced convection, conduction through module housing and a parallel network of natural convection resistance and radiation resistance. In most cases, natural convection resistance is the dominant resistance. For the range of experimental conditions, natural convection heat transfer coefficient is proportional to $\Delta T_{eff}$ to a power less than one (e.g., ⅙). Therefore, $h_{eff}$ can be considered to be approximately constant. In the current experiments, the same amount of heat input was used.

Figure 34:
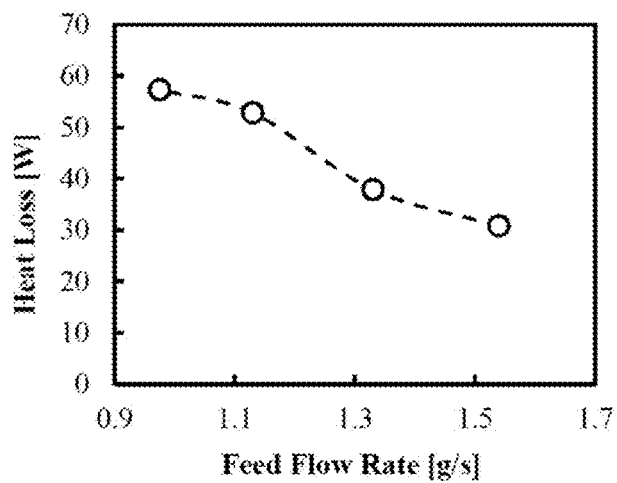
FIG. 34 is a plot of heat loss as a function of feed mass flow rate for CGMD (1.24 mm copper mesh) test with 174 W total heat input.

The feed stream is heated up to a higher temperature when the mass flow rate is lower. Consequently, at a lower mass flow rate, $\Delta T_{eff}$ is higher, resulting in increased heat loss. In this experimental setup, heat loss was significant—accounting for roughly 20% of the heater power. Again, for lower mass flow rates, the heater power as an absolute magnitude is lower. While $Q_{loss}$ is a function of only the surface area and $\Delta T_{eff}$, and is not directly affected by changes in flow rate, for a constant top temperature system, for example, the magnitude of heat input would still be lower for the lower mass flow rate system, leading to a higher percentage heat loss. This large heat loss is the second reason why GOR was low for this experimental setup. While the numerical model ignores heat loss and predicts an exponential increase in GOR, at lower flow rates, the experiment shows a leveling off of GOR. This leveling off is also a result of higher heat losses at the lower flow rate cases due to higher top temperature in the module, as shown in FIG. 34. The heat loss is calculated by applying the energy balance on the MD module as shown in the following equation:

$$\dot{Q}_{loss} = \dot{m}_f c_p T_h - \dot{m}_b c_p T_p + \dot{m}_f c_p (T_{c,in} - T_{c,out}), \quad (9)$$

Conclusions:

Numerical models predict that the GOR of a well-designed CGMD configuration with high $k_{gap}$ can be more than two times higher than that of an AGMD system of the same membrane area. Experimentally, using woven mesh spacers of relatively low $k_{eff}$, the predicted trends in GOR were verified. The GOR of the CGMD system was up to 60% higher than that of AGMD, and PGMD outperforms AGMD by about 20%. The higher GORs of PGMD and CGMD are due to lower transport resistances within the module leading to better preheating of the feed. The effect on reducing the flux of heat loss and cross-conductance in MD modules machined compactly with a common condensation surface is explained, which facilitates better design of additional embodiments of bench-scale conductive-gap MD systems.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. An apparatus for energy-efficient conductive-gap distillation comprising:
   a feed-liquid source including a feed liquid;
   a distillation module comprising:
   a) a feed-liquid chamber containing feed liquid in fluid communication with the feed-liquid source to establish a flow of the feed liquid through the feed-liquid chamber, wherein the feed-liquid chamber includes a selectively porous material that allows a component of the feed liquid to pass through the selectively porous material and exit the feed-liquid chamber in vapor form but not in liquid form, wherein the selectively porous material has an overall thermal conductance of less than 500 W/m²·K;
   b) a conductive-gap chamber adjacent to the selectively porous material on an opposite side of the selectively porous material from feed-liquid chamber, wherein the conductive-gap chamber is filled with liquid;
   c) a heat-transfer surface maintained at a lower temperature than the feed liquid locally at points of contact between the heat-transfer surface and the feed liquid in the feed-liquid chamber, wherein the heat-transfer surface is in thermal contact with the conductive-gap chamber; and
   d) thermally conductive fins extending from the heat-transfer surface across the conductive-gap chamber and supporting the selectively porous material from collapsing onto the heat-transfer surface.

2. An apparatus for energy-efficient conductive-gap distillation comprising:
   a feed-liquid source including a feed liquid;
   a distillation module comprising:
   a) a first feed-liquid chamber in fluid communication with the feed-liquid source, the first feed-liquid chamber including a heat-transfer wall;
   b) a conduit coupled with the first feed-liquid chamber to extract the feed liquid after the feed liquid flows through the first feed-liquid chamber;
   c) a heat source configured to heat the feed liquid in the conduit;
   d) a conductive-gap chamber filled with liquid and adjacent the heat-transfer wall;
   e) a second feed-liquid chamber coupled with the conduit and configured to receive the feed liquid after the feed liquid flows through the conduit and is heated by the heat source, wherein the second feed-liquid chamber includes a selectively porous material that allows a component of the feed liquid to pass through the selectively porous material and exit the second feed-liquid chamber in vapor form but not in liquid form, wherein one side of the selectively porous material faces a surface of the heat-transfer wall of the first feed-liquid chamber across the conductive-gap chamber in a configuration that allows the vapor to condense into the liquid in the conductive-gap chamber such that the liquid then conducts condensation energy through the heat-transfer wall into the first liquid chamber, and wherein the selectively porous material has an overall thermal conductance of less than 500 W/m²·K; and f) thermally conductive fins extending from the heat-transfer wall across the conductive-gap chamber and supporting the selectively porous material from collapsing onto the heat-transfer wall while leaving passages for flow of the liquid condensate through the conductive-gap chamber; and a condensate collection receptacle in fluid communication with a gap between the selectively porous material and the heat-transfer wall.

3. The apparatus of claim 2, wherein the feed liquid comprises a volatile component and a less-volatile component from which the volatile component is separated via vaporization through the selectively porous material.

4. The apparatus of claim 2, wherein the feed liquid comprises water, and wherein the liquid in the conductive-gap chamber is water.

5. The apparatus of claim 4, wherein the feed liquid further comprises at least one of the following: water including dissolved salt, water including suspended solute, water including suspended oil, water-alcohol mixture, and fruit juice.

6. The apparatus of claim 2, wherein the selectively porous material has a contact angle with the feed liquid of greater than 90° and allows the vapor to pass through while preventing liquid feed from passing through.

7. The apparatus of claim 6, wherein the selectively porous material comprises at least one of the following: a polymer membrane, a porous ceramic material, and a porous graphene material.

8. The apparatus of claim 7, wherein the polymer membrane comprises at least one of the following: polyvinylidene difluoride, polytetrafluoroethylene, and polypropylene.

9. The apparatus of claim 2, wherein the thermally conductive fins have a thermal conductivity greater than 5 W/(m·K).

10. The apparatus of claim 2, wherein the thermally conductive fins have a thermal conductivity greater than 100 W/(m·K).

11. The apparatus of claim 2, wherein the thermally conductive fins comprise at least one of the following: a metal, sapphire, a composite, a conductive plastic, carbon nanotubes, and carbon fiber.

12. The apparatus of claim 2, wherein the thermally conductive fins are anisometric and have a thermal conductivity greater than 5 W/(m·K) in a direction through the heat-transfer wall.

13. The apparatus of claim 2, wherein the heat transfer wall defines grooves between the fins, wherein the grooves are configured to flow pure water out of the gap, and wherein the selectively porous material is in contact with the fins.

14. The apparatus of claim 2, wherein the surface of the heat-transfer wall that faces the selectively porous material is corrugated and increases the overall heat conductance of the gap.

15. The apparatus of claim 2, wherein the thermally conductive fins extend across the conductive-gap chamber across top, middle, and bottom thirds of the conductive-gap chamber.

16. The apparatus of claim 2, wherein thermally conductive fins are also included in at least one of the first and the second feed-liquid chambers, improving heat transfer in the feed-liquid chamber in which it is included.

17. The apparatus of claim 2, wherein the selectively porous material is a flat membrane.

18. The apparatus of claim 2, wherein the distillation module is spiral wound.

19. A method for energy-efficient liquid gap distillation, comprising:

flowing a feed liquid through a first feed-liquid chamber of a distillation module, wherein the first-feed liquid chamber includes a heat-transfer wall;

heating the feed liquid;

flowing the heated feed liquid through a second feed-liquid chamber of the distillation module, wherein the second feed-liquid chamber includes a selectively porous material that includes an outer surface in fluid communication with a gap between the selectively porous material and the first feed-liquid chamber, wherein the selectively porous material has an overall thermal conductance of less than 500 W/m²·K;

transferring heat from the feed liquid in the second feed-liquid chamber through thermally conductive fins extending from the heat-transfer wall across the conductive-gap chamber and supporting the selectively porous material from collapsing into the heat-transfer wall;

permeating a vapor component from the feed liquid in the second feed-liquid chamber through the selectively porous material into the conductive-gap chamber;

condensing the vapor component of the feed liquid to form a liquid condensate that fills the conductive-gap chamber;

removing the liquid condensate from the conductive-gap chamber; and removing from the second feed-liquid chamber a brine remaining from the feed liquid after the vapor component permeates through the selectively porous material.

20. The method of claim 19, wherein the vapor component passes through micropores in the selectively porous material, while the flow of liquid-phase components from feed liquid through the micropores is prevented.

21. The method of claim 19, wherein the thermally conductive fins transfer more heat across the conductive-gap chamber than would be transferred in an absence of the thermally conductive fins.

22. The method of claim 19, wherein the thermally conductive fins generate a higher flux of vaporized pure water across the selectively porous material than would be achieved in an absence of the thermally conductive fins.

23. The method of claim 19, wherein the thermally conductive fins achieve the distillation with greater energy efficiency than would be achieved in an absence of the thermally conductive fins.

24. The method of claim 19, wherein the feed liquid entering the second feed-liquid chamber is at a temperature in a range from 40° C. to 100° C.

25. The method of claim 19, wherein the feed-liquid temperature is raised to the range of 40° C. to 100° C. via heating provided by a solar heat collector.

26. The method of claim 19, wherein the feed liquid entering the second feed-liquid chamber is pressurized with its temperature increased to a range from 100° C. and 140° C.

27. The method of claim 19, wherein the feed liquid has a salinity between 0.5 to 40% salt.

28. A method of high-effectiveness heat transfer between two fluids while also producing additional pure water from the hot feed liquid comprising:

flowing a cool fluid through a coolant-flow chamber of a distillation module, wherein the coolant-flow chamber includes a heat-transfer wall;

flowing a hot feed liquid through a hot-feed-liquid chamber of the distillation module, wherein the hot feed liquid has a higher temperature than the cool fluid, and wherein the hot-feed-liquid chamber includes a selectively porous material that includes an outer surface in fluid communication with a conductive-gap chamber between the selectively porous material and the coolant-flow chamber, wherein the selectively porous material has an overall thermal conductance of less than 500 $W/m^2 \cdot K$;

transferring heat from the feed liquid in the hot-feed-liquid chamber through thermally conductive fins extending from the heat-transfer wall across the conductive-gap chamber and supporting the selectively porous material from collapsing onto the heat-transfer wall;

permeating a vapor component from the hot feed liquid in the hot-feed-liquid chamber through the selectively porous material into the conductive-gap chamber;

condensing the vapor component of the hot feed liquid to form a liquid condensate that fills the conductive-gap chamber;

removing the liquid condensate from the conductive-gap chamber; and removing, from the hot-feed-liquid chamber, a cooler brine remaining from the hot feed liquid after the vapor component permeates through the selectively porous material; and removing the cool fluid as a warmer stream from the coolant-flow chamber after energy is transferred into the cool fluid from the conductive-gap chamber.

* * * * *